(12) United States Patent
Couture et al.

(10) Patent No.: US 7,784,570 B2
(45) Date of Patent: Aug. 31, 2010

(54) ROBOTIC VEHICLE

(75) Inventors: Adam P. Couture, Allston, MA (US);
Richard Page, Middleton, MA (US);
John P. O'Brien, Newton, MA (US);
Mikhail Filippov, Arlington, MA (US)

(73) Assignee: iRobot Corporation, Bedford, MA (US)

( * ) Notice: Subject to any disclaimer, the term of this patent is extended or adjusted under 35 U.S.C. 154(b) by 270 days.

(21) Appl. No.: 11/834,658

(22) Filed: Aug. 6, 2007

(65) Prior Publication Data

US 2008/0223630 A1   Sep. 18, 2008

Related U.S. Application Data

(63) Continuation-in-part of application No. 11/762,315, filed on Jun. 13, 2007, and a continuation of application No. 11/762,458, filed on Jun. 13, 2007, now Pat. No. 7,600,593.

(60) Provisional application No. 60/828,606, filed on Oct. 10, 2006, provisional application No. 60/942,598, filed on Jun. 7, 2007, provisional application No. 60/878,877, filed on Jan. 5, 2007, provisional application No. 60/908,782, filed on Mar. 29, 2007.

(51) Int. Cl.
*B62D 55/00* (2006.01)

(52) U.S. Cl. .................. 180/9.1; 180/9.32; 180/9.4; 180/65.8; 180/9.62; 901/1; 701/22; 305/127; 305/199; 305/126; 305/195

(58) Field of Classification Search ................ None
See application file for complete search history.

(56) References Cited

U.S. PATENT DOCUMENTS 1,069,761 A   8/1913   Buckley 2,917,120 A   12/1959   Gates et al.

(Continued)

FOREIGN PATENT DOCUMENTS

JP   60176871   9/1985

(Continued)

OTHER PUBLICATIONS

PackBot "iRobot PackBot Explorer" Brochure.

(Continued)

*Primary Examiner*—Lesley D Morris
*Assistant Examiner*—Marlon A Arce
(74) *Attorney, Agent, or Firm*—Fish & Richardson P.C.

(57) ABSTRACT

A robotic vehicle is disclosed, which is characterized by high mobility, adaptability, and the capability of being remotely controlled in hazardous environments. The robotic vehicle includes a chassis having front and rear ends and supported on right and left driven tracks. Right and left elongated flippers are disposed on corresponding sides of the chassis and operable to pivot. A linkage connects a payload deck, configured to support a removable functional payload, to the chassis. The linkage has a first end rotatably connected to the chassis at a first pivot, and a second end rotatably connected to the deck at a second pivot. Both of the first and second pivots include independently controllable pivot drivers operable to rotatably position their corresponding pivots to control both fore-aft position and pitch orientation of the payload deck with respect to the chassis.

18 Claims, 35 Drawing Sheets

U.S. PATENT DOCUMENTS

| | | |
|---|---|---|
| 3,092,200 A | 6/1963 | Chambers |
| 3,166,138 A | 1/1965 | Dunn, Jr. |
| 3,311,424 A | 3/1967 | Taylor |
| 3,489,236 A | 1/1970 | Goodwin |
| 4,009,761 A | 3/1977 | Meyer |
| 4,027,889 A | 6/1977 | Krofchalk et al. |
| 4,247,125 A | 1/1981 | Rayment |
| 4,477,998 A | 10/1984 | You |
| 4,483,407 A | 11/1984 | Iwamoto et al. |
| 4,492,058 A | 1/1985 | Goldfarb et al. |
| 4,566,550 A | 1/1986 | Misawa |
| 4,566,551 A | 1/1986 | Feliz |
| 4,570,954 A | 2/1986 | Mintz |
| 4,645,222 A | 2/1987 | Hester |
| 4,674,585 A | 6/1987 | Barlow et al. |
| 4,687,068 A | 8/1987 | Pagett |
| 4,688,813 A | 8/1987 | Misawa et al. |
| 4,702,331 A | 10/1987 | Hagihara et al. |
| 4,709,773 A | 12/1987 | Clement et al. |
| 4,730,684 A | 3/1988 | Pedersen |
| 4,813,906 A | 3/1989 | Matsuyama et al. |
| 4,898,256 A | 2/1990 | Lehner |
| 4,919,489 A | 4/1990 | Kopsco |
| 4,932,491 A | 6/1990 | Collins, Jr. |
| 4,932,831 A | 6/1990 | White et al. |
| 4,977,971 A | 12/1990 | Crane, III et al. |
| 4,993,912 A | 2/1991 | King et al. |
| 5,022,812 A | 6/1991 | Coughlan et al. |
| 5,174,405 A | 12/1992 | Carra et al. |
| 5,197,558 A | 3/1993 | Misawa |
| 5,248,008 A | 9/1993 | Clar |
| 5,308,098 A | 5/1994 | Shea |
| 5,337,846 A | 8/1994 | Ogaki et al. |
| 5,413,367 A | 5/1995 | Ochiai |
| 5,507,358 A | 4/1996 | Abe et al. |
| 5,515,934 A | 5/1996 | Davis |
| 5,579,857 A | 12/1996 | Abe et al. |
| 5,833,248 A | 11/1998 | Eguchi |
| 5,868,403 A | 2/1999 | Culp et al. |
| 5,884,718 A | 3/1999 | Yamashiro et al. |
| 5,890,553 A | 4/1999 | Bar-Cohen et al. |
| 5,921,843 A | 7/1999 | Skrivan et al. |
| 6,099,091 A | 8/2000 | Campbell |
| 6,144,180 A | 11/2000 | Chen et al. |
| 6,158,536 A | 12/2000 | Misawa |
| 6,216,807 B1 | 4/2001 | Eckhoff |
| 6,263,989 B1 | 7/2001 | Won |
| 6,267,196 B1 | 7/2001 | Wilcox et al. |
| 6,431,296 B1 | 8/2002 | Won |
| 6,523,629 B1 | 2/2003 | Buttz et al. |
| 6,619,414 B2 | 9/2003 | Rau |
| 6,999,849 B2 | 2/2006 | Bridges |
| 7,083,013 B2 | 8/2006 | Chuan |
| 7,348,747 B1 * | 3/2008 | Theobold et al. ........ 318/568.21 |
| 7,600,592 B2 * | 10/2009 | Goldenberg et al. ......... 180/9.1 |
| 7,600,593 B2 * | 10/2009 | Filippov et al. .............. 180/9.1 |
| 2002/0062999 A1 | 5/2002 | De-Noor et al. |
| 2002/0189871 A1 | 12/2002 | Won |
| 2003/0183428 A1 | 10/2003 | Hedeen |
| 2008/0265821 A1 * | 10/2008 | Theobald ................ 318/568.12 |

FOREIGN PATENT DOCUMENTS

| | | |
|---|---|---|
| JP | 61-160366 | 7/1986 |
| JP | 63-203483 | 8/1988 |
| JP | 6032263 | 2/1994 |
| JP | 8152916 | 6/1996 |
| WO | WO 89/00928 | 2/1989 |

OTHER PUBLICATIONS

PackBot "Tactical Mobile Robot" Brochure.
PackBot "Hazardous Duty Mobile Robot" Brochure.
Sadath M Malik et al. "Virtual Prototyping for Conceptual Design of a Tracked Mobile Robot". Electrical and Computer Engineering, Canadian Conference on, IEEE, PI. May 1, 2006, pp. 2349-2352.
International Search Report and Written Opinion of the International Searching Authority in connection with International Application No. PCT/US2007/080138 dated Jun. 25, 2009. Examined by Saida Isliy, 68 pages.
Autonomous Mobile Robots, Chapter 2; Locomotion Concepts Oct. 9, 2004.
Falcone et al. "The Personal Rover" The Robotics Institute Carnegie Mellon University Pittsburgh, PA 15213; 2002.

* cited by examiner

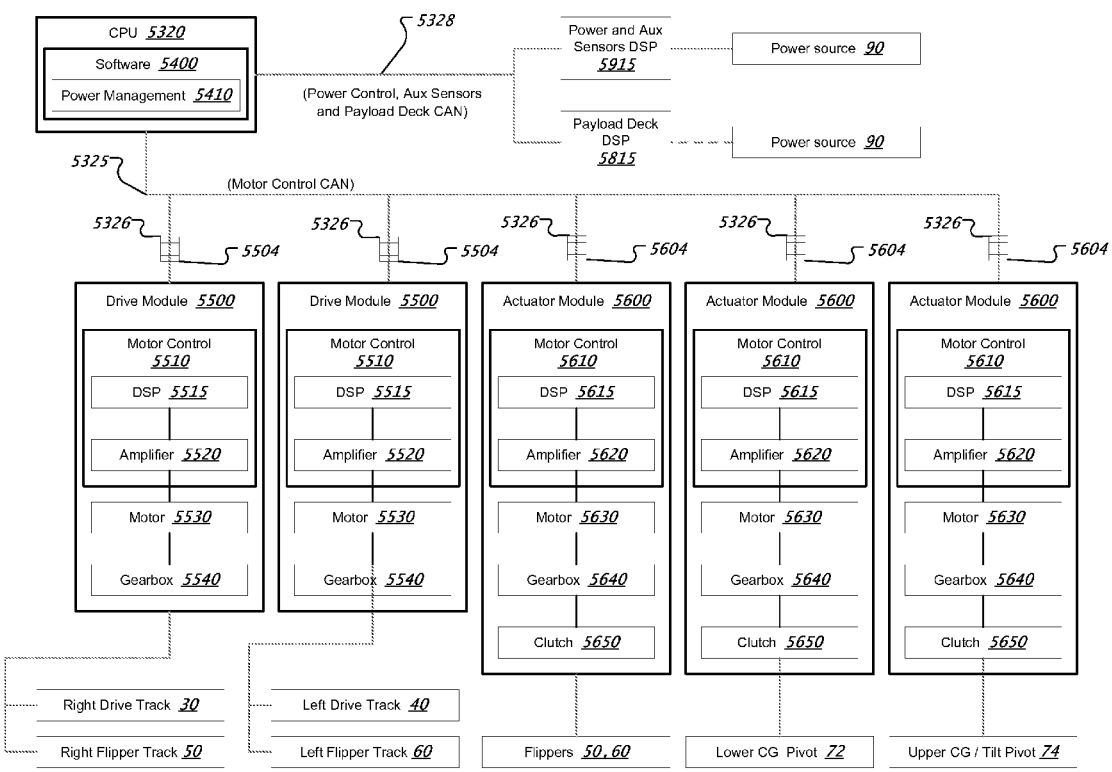

ROBOTIC VEHICLE

CROSS-REFERENCE TO RELATED APPLICATIONS

This U.S. patent application claims priority under 35 U.S.C. §119(e) to U.S. Provisional Application 60/828,606, filed on Oct. 10, 2006, U.S. Provisional Application 60/942,598, filed on Jun. 7, 2007, U.S. Provisional Application 60/878,877, filed on Jan. 5, 2007, and U.S. provisional patent application 60/908,782, filed on Mar. 29, 2007. The disclosures of the aforementioned prior applications are hereby incorporated by reference in their entireties and are therefore considered part of the disclosure of this application.

STATEMENT AS TO FEDERALLY SPONSORED RESEARCH

This invention was in part with Government support under contract N41756-06-C-5512 awarded by the Technical Support Working Group of the Department of Defense. The Government may have certain rights in the invention.

TECHNICAL FIELD

This disclosure relates to robotic vehicles.

BACKGROUND

A new generation of robotic systems and tools is required to meet the increasing terrorist threat in the US and abroad. The lack of adaptability and limited capability of existing remote controlled systems available to Hazardous/First Response/Explosive Ordnance Disposal (EOD) teams has frustrated many teams worldwide. The unique and often dangerous tasks associated with the first responder mission require personnel to make quick decisions and often adapt their tools in the field to combat a variety of threats. The tools must be readily available, robust, and yet still provide surgical precision when required.

Robots for versatile tasks potentially may be built in any reasonable size. Known production robots are usually in the 40-100 lb. range, which may be carried by an infantryman at the low end and by a utility vehicle at the upper end. Production robots are different from research robots—practical considerations outweigh theoretical capabilities. Robots of increased size have been proposed, but as they become larger, necessary capabilities compete with one another. Size and weight are limited by deployment and power/refueling/battery life constraints. Minimum size and weight are limited by the necessity of carrying useful payloads, and again, power/refueling/battery life constraints. The effects of the square-cube law complicate the necessary balance, because the volume or weight often grows with the cube of the size increase.

SUMMARY

In one aspect, a skid steer drive includes a drive wheel and a first volume within the skid steer drive adjacent the drive wheel. The skid steer drive includes a load shifting assembly including a tilt motor, and having a second volume within the load shifting assembly adjacent the tilt motor. The skid steer drive includes a chassis having a third volume within the chassis adjacent the drive wheel; and at least three sets of motive power elements, among them a battery assembly, main drive motor assembly, and load shifting motor assembly, the three sets of motive power elements being distributed among the first volume, second volume, and third volume.

In another aspect, a mobile robot includes a skid steer drive having a drive wheel and a first volume within the skid steer drive adjacent the drive wheel. The mobile robot includes a load shifting assembly including a load tilting motor and a load shifting motor, and having a second volume within the load shifting assembly adjacent the load tilting motor. The mobile robot includes a chassis having a third volume within the chassis adjacent the drive wheel, and a through space into which the load shifting assembly may seat itself, and a main drive motor amplifier and load shifting motor amplifier located in the first volume, a battery assembly being located in the second volume, and a main drive motor and the load shifting motor being located in the third volume.

In yet another aspect, a mobile robot includes a skid steer drive having a drive wheel and a first volume within the skid steer drive adjacent the drive wheel and a load shifting assembly having a second volume therewithin. The mobile robot includes a chassis having a third volume within the chassis adjacent the drive wheel, and a through space into which the load shifting assembly may seat itself. The mobile robot also includes a main drive motor amplifier being located in the first volume, a battery assembly and the load tilting motor located in the second volume so that the battery assembly tilts together with the load shifting assembly, and a main drive motor being located in the third volume.

In yet another aspect, an environmentally sealed mobile robot includes a skid steer drive having a first volume therewithin and a cast unitary load shifting assembly having a second volume therewithin. The mobile robot includes a cast unitary chassis having a third volume adjacent the skid steer drive internally connected via a passage to a fourth volume adjacent the first volume. The mobile robot also includes a sealed hollow linkage connecting the second volume and the third volume. The mobile robot includes a main drive motor amplifier being sealed into the first volume and fourth volume and powering a main drive motor in the third volume via the passage, a battery assembly and the load tilting motor being sealed into second volume so that the battery assembly tilts together with the load shifting assembly and the battery powers the main drive motor amplifier and main drive motor via the sealed hollow linkage.

In another aspect, a mobile robot includes a tracked drive having a drive wheel and a first volume within the envelope of the tracked drive and a load shifting assembly having a second volume therewithin. The mobile robot also includes a chassis into which the first volume extends, and having a third volume therewithin adjacent the drive wheel. The first volume housing a motor amplifier that sinks heat via the chassis, the second volume housing a battery assembly and load tilting motor assembly that sink heat via the load shifting assembly; and the third volume housing drive motors that sink heat via the chassis.

According to another aspect of the disclosure, a robotic vehicle includes a chassis having front and rear ends and supported on right and left driven tracks, each track trained about a corresponding front wheel rotatable about a front wheel axis. Right and left elongated flippers are disposed on corresponding sides of the chassis and operable to pivot about the front wheel axis of the chassis, each flipper having a driven track about its perimeter. A linkage connects a payload deck assembly, configured to support a functional, securely mounted and integrated payload (in some cases, modular payloads, unconnected payloads and/or functional payload), to the chassis. The linkage has a first end rotatably connected to the chassis at a first pivot, and a second end rotatably connected to the deck at a second pivot. Both of the first and second pivots include independently controllable pivot drivers operable to rotatably position their corresponding pivots to control both fore-aft position (as well as vertical position, the pivots being interconnected by a linkage that makes a swept motion) and pitch orientation of the payload deck assembly with respect to the chassis. In one example, the first pivot is rotatable through an angle of at least 180 degrees. The first pivot is not necessarily limited by a range of motion of the pivot, but rather by those positions in which the linkage, deck assembly, or payload interfere with part of the robot such as the chassis or with the ground—which may depend on the character of the ground and pose of the robot. Accordingly, in another implementation, the sweep of the linkage is limited by the chassis of the robot, which is configured as small tube element connecting chassis arms. The deck assembly and linkage may sweep between the chassis arms and between the flippers in either direction, and may sweep past a horizontal line defined by one chassis track wheel and bogey, in either direction fore or aft of the pivot. In another implementation, the sweep is limited to 74 degrees to improve stability and shock resistance on open ground. In each case, the payload deck assembly, with or without payload(s), may be tilted to move the center of gravity of the robot further in a desired direction. The linkage may comprise two parallel links spaced apart laterally.

The independently controllable pivot drivers provide both fore-aft position (and a wide sweep range) and pitch orientation of the payload deck assembly with respect to the chassis to selectively displace a center of gravity of the payload deck assembly both forward and rearward of a center of gravity of the chassis. This provides enhanced mobility to negotiate obstacles. Hereinafter, center of gravity or center of mass may be abbreviated "CG."

Rotation of the linkage about its first and second pivots enables selective positioning of a center of gravity or center of mass of the payload deck assembly both fore and aft the front wheel axis as well as both fore and aft of a center of gravity of the chassis. In one implementation, the first pivot of the linkage is located above and forward of the front wheel axis and swings the linkage for displacing the center of gravity of the payload deck assembly to a desired location. Furthermore, when the first end of the linkage is rotatably connected near the front of the chassis, the payload deck assembly is displaceable to an aftmost position in which the payload deck assembly is located within a footprint of the chassis.

In one example, the payload deck assembly includes connection points for both a functional payload power link and a functional payload communication link, which may comprise an Ethernet link. In one implementation, the functional payload communication link is a packet switched network connectable to a distribution switch or router.

The payload deck assembly includes an electronics bin (also "CG tub") which holds most of the electronics of the robot (as well as the upper motor(s) for tilting the payload deck assembly, but excepting motor control and drivers for the drive motors, which is housed in the chassis), and supports a dockable battery unit slid into the bottom of the electronics bin as well as a accepting a modular payload deck, which defines threaded holes to accept functional payloads and includes multiple functional payload connection pads positioned to accommodate selective connection of multiple functional payload units to the payload deck. Each connection pad includes connection points for both functional payload power and functional payload communication (as well as sufficient hard points nearby for such payloads to be secured to the deck with sufficient fasteners to reliably secure the mass of the payload through tilting operations of the deck). The payload deck can accept as a payload unit a removable radio receiver unit (which can communicate with a remote controller unit) operably connected to a drive system of the chassis. A battery unit is also removable secured to the bottom of the deck, so as to place the significant weight of batteries as low as possible in the mass that is used for shifting the center of gravity of the vehicle. In one example, the payload deck constitutes between about 30 and 50 percent of a total weight of the vehicle. The payload deck may also accept an Ethernet camera as a payload unit.

In one implementation, the payload deck further accepts as payload units removable sensor units. The sensor may be, for example, infrared, chemical, toxic, light, noise, and weapons detection.

The left and right flippers comprise elongated members, wherein flipper tracks are trained about corresponding rear wheels independently rotatable about the front wheel axis.

The robotic vehicle can climb a step by using the independently controllable pivot drivers to control both sweep and pitch orientation of the payload deck assembly with respect to the chassis to selectively displace the center of gravity of the payload deck assembly the both forward and rearward of the center of gravity of the chassis. The robotic vehicle may initiates a step climb by pivoting the first and second flippers upward to engage the edge of the step. Different obstacles can be accommodated by different strategies that use the full range of the sweepable and tiltable CG of the entire payload deck assembly, or of the payload deck assembly when combined with a payload. An advantage of the disclosed system is that the addition of payload weight on the payload deck assembly increases the flexibility and mobility of the robot with respect to surmounting obstacles of various shapes. The robotic vehicle also positions the center of gravity of the payload deck assembly above the front end of the chassis. Next, the robotic vehicle pivots the first and second flippers downward on the edge of the step to engage the top of the step and drives forward. The robotic vehicle continues to displace the center of gravity of the payload deck assembly beyond the front of the chassis by rotating both the first and second pivots. As shown in FIG. 14, tilting the deck assembly further advances the center of gravity of the entire vehicle. Finally, the robotic vehicle drives forward to pull the chassis over the edge of the step.

In another aspect of the disclosure, a skid steered robot includes a chassis supporting a skid steered drive and a set of driven flippers, each flipper being pivotable about a first pivot axis common with a drive axis of the chassis. A linkage substantially at the leading end of the chassis is pivotable about a second pivot axis. A deck assembly is pivotable about a third pivot axis substantially at a distal end of the linkage. The deck assembly includes a power supply, a packet network connection, a modular deck support structure; and a modular deck. The modular deck includes a deck mount which fits the modular deck support structure and at least two externally available common connectors. At least one of the deck assembly or modular deck includes a power supply switching circuit that switches available power from the power supply between the at least two common connectors, and a network switch that switches packet network traffic between the at least two common connectors.

In another aspect of the disclosure, a skid steered robot includes a set of driven flippers, each flipper being pivotable about a first pivot axis common with a drive axis of the chassis. A deck assembly, disposed above the chassis, includes a power supply, a packet network connection, a modular deck support structure, a deck wiring harness connector including packet network cabling and power cabling, and a modular deck. The modular deck includes a deck mount which fits the modular deck support structure, at least two externally available common connectors, a power supply switching circuit that switches available power from the power supply between at least two common connectors, a network switch that switches packet network traffic between the at least two common connectors, and a deck wiring harness that connects to the deck wiring harness connector and carries power and network to and from the modular deck.

In another aspect of the disclosure, a modular deck for a robotic vehicle includes a base configured to be secured to the vehicle, wherein the base receives both a power link and a communication link from the robotic vehicle. A platform configured to support a removable functional payload is secured to the base and has at least one connection point for both a functional payload power link and a functional payload communication link. The connection point is linked to both the base power link and the base communication link.

In one aspect, a robotic vehicle includes a chassis having front and rear ends, an electric power source supported by the chassis, and multiple drive assemblies supporting the chassis. Each drive assembly includes a track trained about a corresponding drive wheel and a drive control module. The drive control module includes a drive control housing, a drive motor carried by the drive control housing and operable to drive the track, and a drive motor controller in communication with the drive motor. The drive control module may further include a back-drivable gearbox coupling the motor to the track. The drive motor controller includes a signal processor and an amplifier commutator in communication with the drive motor and the signal processor and is capable of delivering both amplified and reduced power to the drive motor from the power source. The drive control module may communicate with a robot controller over a controller area network bus.

In one implementation, the drive motor controller further comprises a health monitor for monitoring the proper functioning of the signal processor and the amplifier commutator. The health monitor sends a signal to the amplifier commutator to cease operation of the motor upon detecting a malfunction. In one instance, the amplifier commutator includes a commutator in communication with the drive motor, a DC/DC converter capable of delivering both amplified and reduced power to the commutator, and a programmable logic circuit in communication with the signal processor, DC/DC converter, and commutator.

In another implementation, the drive control module also includes multiple magnetic field sensors mounted radially about to the motor to detect magnetic pulses, a velocity sensor connected to the motor, and a rotary position sensor connected to the motor. The signal processor comprises logic for three cascading control loops comprising motor current, motor voltage, and motor rotor rotation. The current control loop of the signal processor includes reading a current feedback from the commutator, reading the magnetic field sensors, computing a pulse-width modulation output, writing the pulse-width modulation output to a shared structure accessible by the other control loops, and updating a cycle counter. The voltage control loop of the signal processor includes reading a velocity feedback from the velocity sensor, reading a voltage feedback from the DC/DC converter, computing a commanded current based on a current limit, maximum current from a thermal protection model, and a current rate of change limit, and writing the commanded current to a shared structure accessible by the other control loops. The motor rotor rotation control loop of the signal processor includes reading a rotational position feedback from the rotary position sensor, computing a commanded velocity based on current and velocity limits, and writing the commanded velocity to a shared structure accessible by the other control loops.

In one example, the DC/DC converter receives about 42 V from the power source and is capable of delivering between about 0 V and about 150 V. The power source may include three 14 V batteries in series and three 14 V batteries in parallel, providing about 42 V.

In another example, the drive control module is separately and independently removable from a receptacle of the chassis as a complete unit. The drive control module is also sealed within the receptacle of the chassis from an outside environment and passively cooled by the chassis.

In another aspect, a robotic vehicle includes a chassis having front and rear ends and is supported on right and left driven drive tracks. Each drive track is trained about a corresponding front wheel rotatable about a front wheel axis. Right and left elongated flippers are disposed on corresponding sides of the chassis and are operable to pivot about the front wheel axis of the chassis. Each flipper has a driven flipper track. A flipper actuator module is supported by the chassis and is operable to rotate the flippers. At least one drive module is supported by the chassis and is operably connected to drive at least one of the drive and flipper tracks. A payload deck is configured to support a payload and a linkage connects the payload deck to the chassis. The linkage has a first end rotatably connected to the chassis at a first pivot and a second end rotatably connected to the deck at a second pivot. The first and second pivots include respective linkage actuator modules operable to rotatably position their corresponding pivots to control orientation of the payload deck with respect to the chassis. The track drive modules and actuator modules each include a module housing, a motor supported by the module housing, and a motor controller supported by the module housing and in communication with the motor. The linkage actuator modules are each separately and independently removable as complete units. Also, the track drive modules and the flipper actuator module are each separately and independently removable from respective receptacles of the chassis as complete units. In some examples, the actuator modules are each interchangeable and the track drive modules are each interchangeable. Furthermore, the track drive modules and the flipper actuator module may each be sealed within their respective receptacles of the chassis from an outside environment and passively cooled by the chassis.

In some examples, the track drive modules and actuator modules may each communicate with a robot controller over a controller area network bus. The track drive modules and actuator modules may also include a back-drivable gearbox supported by the module housing and coupled to the motor. Furthermore, the actuator modules may include a slip clutch supported by the module housing and coupled to a planetary gearbox. In one example, the motor of the actuator module provides magnetic braking inhibiting actuation upon power loss.

In one implementation, the motor controller includes a signal processor and an amplifier commutator in communication with the drive motor and the signal processor. The amplifier commutator is capable of delivering both amplified and reduced power to the drive motor.

In another implementation, each module includes a power connector disposed on an outer surface of the module housing and configured to mate with a corresponding power bus connector to establish an electric power connection to the module. Each track drive module establishes an electric power connection with the bus power connector within its respective receptacle as the module is placed within the receptacle.

In yet another aspect, a method of controlling a robotic vehicle includes providing a robotic vehicle that includes a chassis having front and rear ends, at least one electric power source supported by the chassis, and a drive assembly supporting the chassis and driven by a drive control module. The drive control module includes a drive control housing, a drive motor carried by the drive control housing and operable to drive the drive assembly, and a drive motor controller in communication with the drive motor. The drive motor controller includes a signal processor and an amplifier commutator in communication with the drive motor and the signal processor. The method also includes providing a robot controller with a power management control logic that recognizes a power source type and monitors an available power level. The robot controller communicates drive commands to the signal processors of each drive control module based on the power source type and the available power level. In one example, the power management control logic monitors a power source temperature as well. Accordingly, the robot controller communicates to the signal processors of each drive control module, delivering drive commands based on the power source temperature.

In one implementation, the signal processor of the drive motor controller checks for regenerative braking, where upon regenerative braking, the signal processor checks the available power level of the power source and charges the power source until a charged level is attained or regenerative breaking ends.

The robotic vehicle may also include a payload deck supported by the chassis. The payload deck is configured to receive at least one electric power source and includes a payload deck signal processor supported by the payload deck. The payload deck signal processor recognizes a power source type, monitors an available power level, and communicates the power source type and available power level of the at least one electric power source to the robot controller. The payload deck signal processor may communicate with the robot controller over a controller area network bus.

In one example, the robotic vehicle includes a linkage connecting the payload deck to the chassis, the linkage having a first end rotatably connected to the chassis at a first pivot, and a second end rotatably connected to the deck at a second pivot. The first and second pivots include respective linkage actuator modules operable to rotatably position their corresponding pivots to control orientation of the payload deck with respect to the chassis. The actuator modules each include an actuator module housing, an actuator motor supported by the module housing, and an actuator motor controller supported by the module housing and in communication with the actuator motor. The actuator motor controller includes a signal processor, an amplifier commutator in communication with the actuator motor and the signal processor, and a slip clutch supported by the module housing and coupling the actuator motor to the respective pivot.

In one instance, the signal processor of the actuator motor controller checks for regenerative impact absorption, such as when the slip clutch absorbs recoil of the payload deck. Upon regenerative impact absorption, the signal processor of the actuator motor controller checks the available power level of the power source and charges the power source until a charged level is attained or regenerative absorption ends.

The details of one or more implementations of the invention are set forth in the accompanying drawings and the description below. Other features, objects, and advantages of the invention will be apparent from the description and drawings, and from the claims.

DESCRIPTION OF DRAWINGS

FIG. 36 is a schematic view of a robotic vehicle.

Like reference symbols in the various drawings indicate like elements.

DETAILED DESCRIPTION

Figure 1:
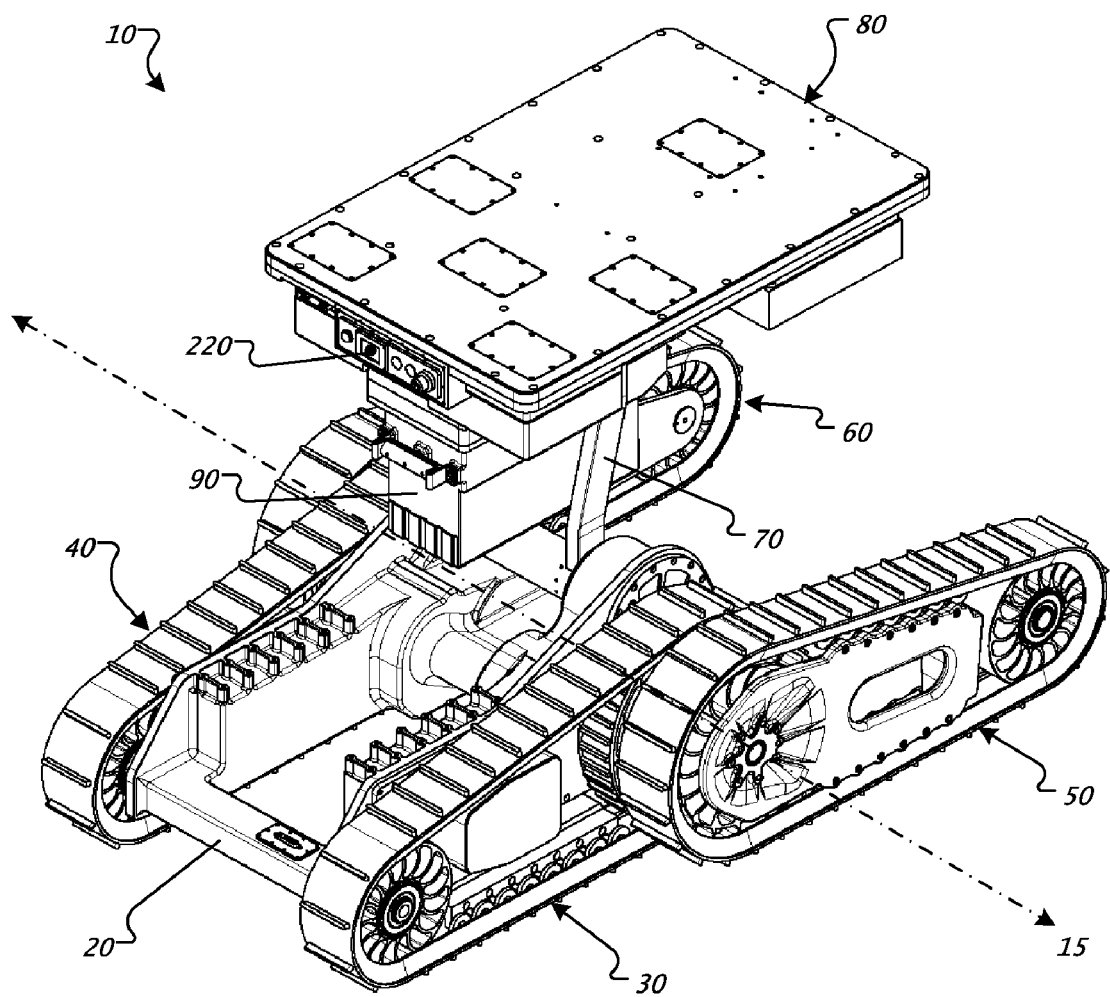
FIG. 1 is a perspective view of a robotic vehicle.

Referring to FIG. 1, a robotic vehicle 10, in one implementation, is a remotely operated vehicle that enables the performance of manpower intensive or high-risk functions (i.e., explosive ordnance disposal; urban intelligence, surveillance, and reconnaissance (ISR) missions; minefield and obstacle reduction; chemical/toxic industrial chemicals (TIC)/toxic industrial materials (TIM); etc.) without exposing operators directly to a hazard. These functions often require the robotic vehicle 10 to drive quickly out to a location, perform a task, and either return quickly or tow something back. The robotic vehicle 10 is operable from a stationary position, on the move, and in various environments and conditions.

Referring to FIGS. 1-6, a robotic vehicle 10 includes a chassis 20 that is supported on right and left drive track assemblies, 30 and 40 respectively, having driven tracks, 34 and 44 respectively. Each driven track 34, 44, is trained about a corresponding front wheel, 32 and 42 respectively, which rotates about front wheel axis 15. Right and left flippers 50 and 60 are disposed on corresponding sides of the chassis 20 and are operable to pivot about the front wheel axis 15 of the chassis 20. Each flipper 50, 60 has a driven track, 54 and 64 respectively, about its perimeter that is trained about a corresponding rear wheel, 52 and 62 respectively, which rotates about the front wheel axis 15.

Figure 7:
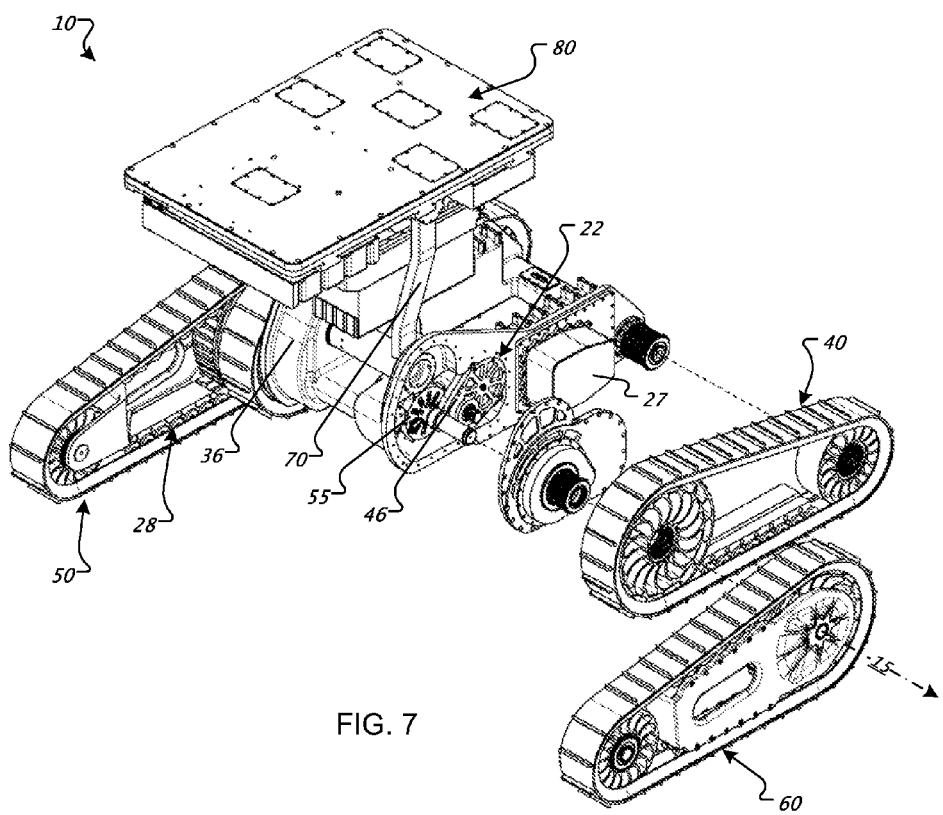
FIG. 7 is an exploded perspective view of the robotic vehicle.

Referring to FIG. 7, in one implementation, the robotic vehicle 10 includes right and left motor drivers, 36 and 46, driving corresponding drive tracks, 34 and 44, and flipper tracks, 54 and 64, which are supported between their front and rear ends by bogie wheels 28. A flipper actuator module 55 is supported by the chassis 20 and is operable to rotate the flippers, 50 and 60. In one example, the flippers 50, 60 are actuated in unison. In other examples, the flippers 50, 60 are actuated independently by right and left flipper actuators 55.

Figure 2:
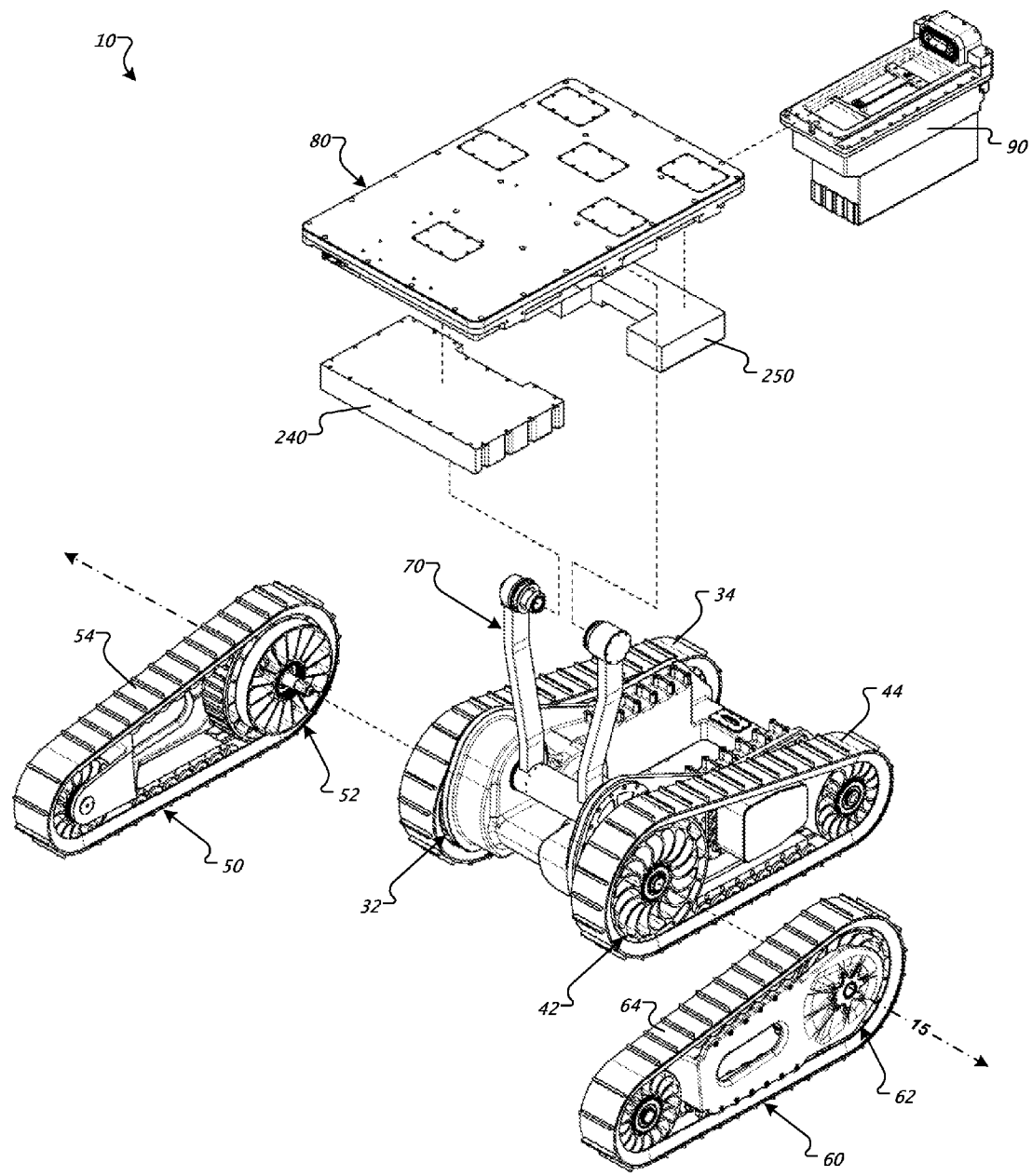
FIG. 2 is an exploded view of the robotic vehicle.
Figure 8:
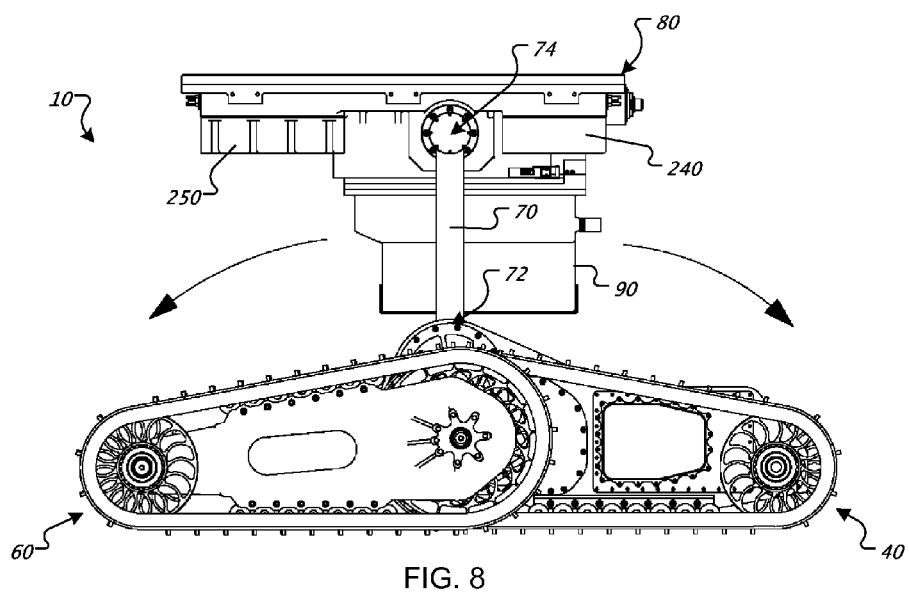
FIG. 8 is a side view of the robotic vehicle.

Referring to FIG. 8, a linkage 70 connects the payload deck assembly 80 to the chassis 20. The linkage 70 has a first end 70A rotatably connected to the chassis 20 at a first pivot 71, and a second end 70B rotatably connected to the payload deck 80 at a second pivot 73. Both of the first and second pivots, 71 and 73 respectively, include respective independently controllable pivot drivers, 72 and 74, operable to rotatably position their corresponding pivots to control both fore-aft position and pitch orientation of the payload deck assembly 80 with respect to the chassis 20. As shown in FIGS. 1-2, the linkage 70 may comprise two parallel links spaced apart laterally.

Figure 9:
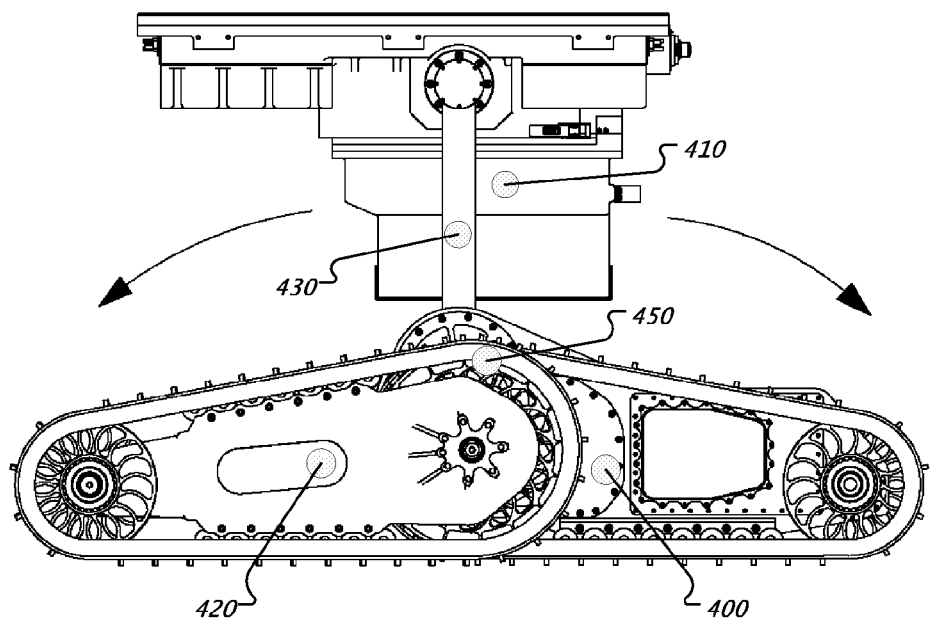
FIG. 9 is an side view of the robotic vehicle.

Referring to FIG. 9, the first end 70A of the linkage 70 is rotatably connected near the front of the chassis 20 such that the payload deck assembly 80 is displaceable to an aftmost position in which the payload deck assembly 80 is located within a footprint of the chassis 20. Furthermore, as shown in FIGS. 1-2, the first pivot 71 of the linkage 70 is located above and forward of the front wheel axis 15. The first pivot 71 is rotatable through an angle of at least 180 degrees (optionally, 74 degrees), in one example. Rotation of the linkage 70 about its first and second pivots, 71 and 73 respectively, enables selective positioning of center of gravity 410 of payload deck assembly 80 both fore and aft front wheel axis 15 as well as both fore and aft a center of gravity 400 of the chassis 20. In another example, the independently controllable pivot drivers 72, 74 provide both fore-aft position (as part of sweep) and pitch orientation of the payload deck assembly 80 with respect to the chassis 20 to selectively displace the center of gravity 410 of the payload deck assembly 80 both forward and rearward of the center of gravity 400 of the chassis 20, displacing a center of gravity 450 of the entire robot 10.

Figure 3:
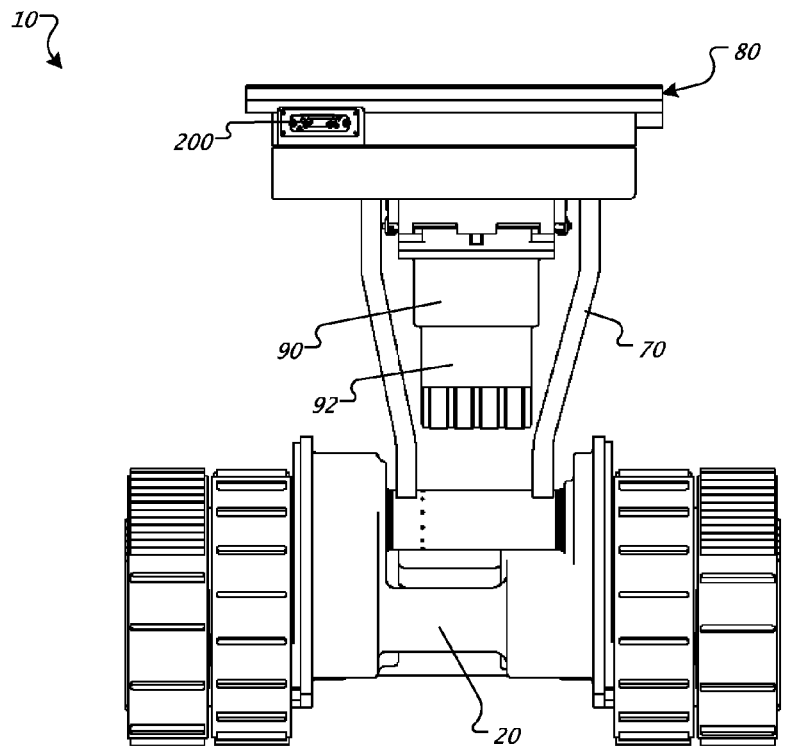
FIG. 3 is a front view of the robotic vehicle.
Figure 6:
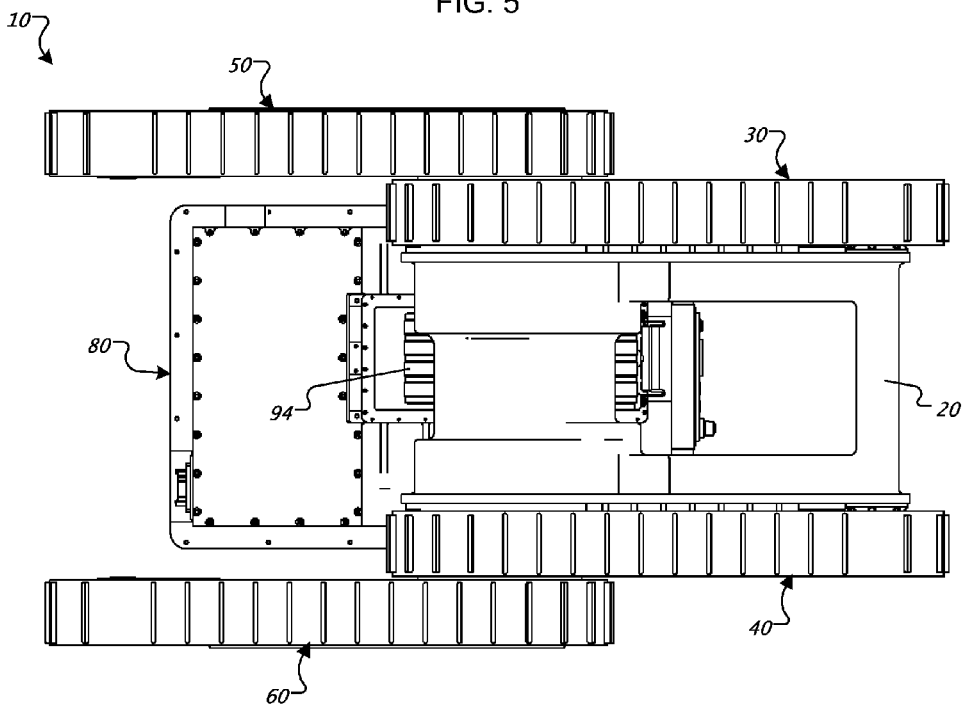
FIG. 6 is a bottom view of the robotic vehicle.

The robotic vehicle 10 is electrically powered (e.g. a bank of nine standard military BB-2590 replaceable and rechargeable lithium-ion batteries). Referring to FIGS. 2-3, the payload deck assembly 80, specifically the electronics tub 90, accommodates a slidable, removable battery unit 92. Skid pad 94, as shown in FIG. 6, may be secured to the bottom of the battery unit 92 to protect the battery 92 and aid manageability. The payload deck assembly 80 may carry an additional battery supply on one of the selectable connection pads 810, increasing the available power capacity (e.g. an additional bank of nine batteries may be carried on payload deck).

Figure 4:
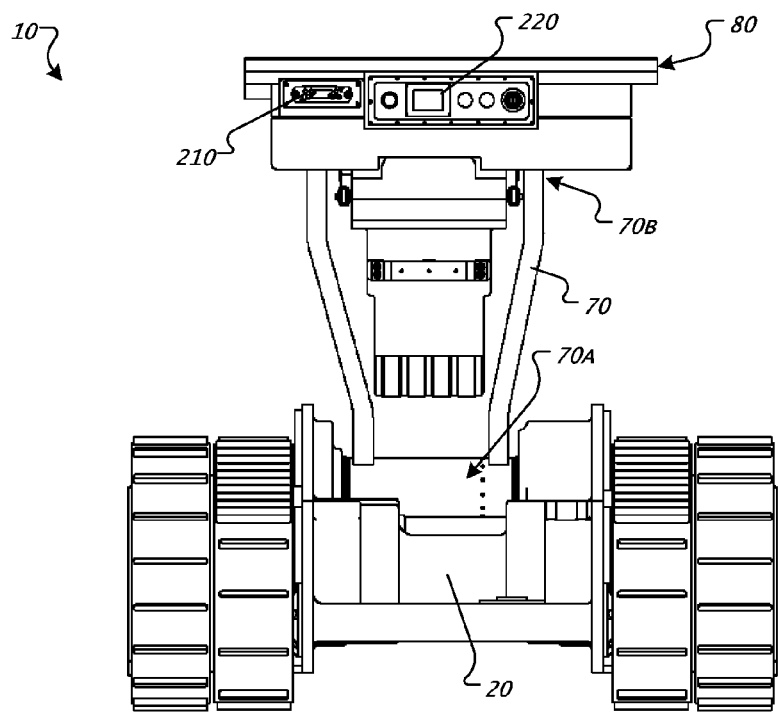
FIG. 4 is a back view of the robotic vehicle.

Referring again to FIGS. 2-6, a payload deck assembly 80, including an electronics bin 90 and payload deck 806 (D1, D2, D3 in other drawings herein), is configured to support a removable functional payload 500. FIGS. 3-4 illustrate the robotic vehicle 10 with the payload deck assembly 80 including front and rear functional payload power connectors, 200 and 210, and a user interface panel 220. FIG. 2 illustrates one example where the payload deck assembly 80 includes front and rear sensor pods, 240 and 250 respectively. In some implementations, the sensor pods 240, 250 provide infrared, chemical, toxic, light, noise, and weapons detection, as well as other types of sensors and detection systems. A primary driving sensor may be housed in a separate audio/camera sensor module mounted to the payload deck assembly 80 that contains at least one visible spectrum camera. Audio detection and generation is realized using an audio/camera sensor module mounted to the payload deck assembly 80, in one example.

Figure 5:
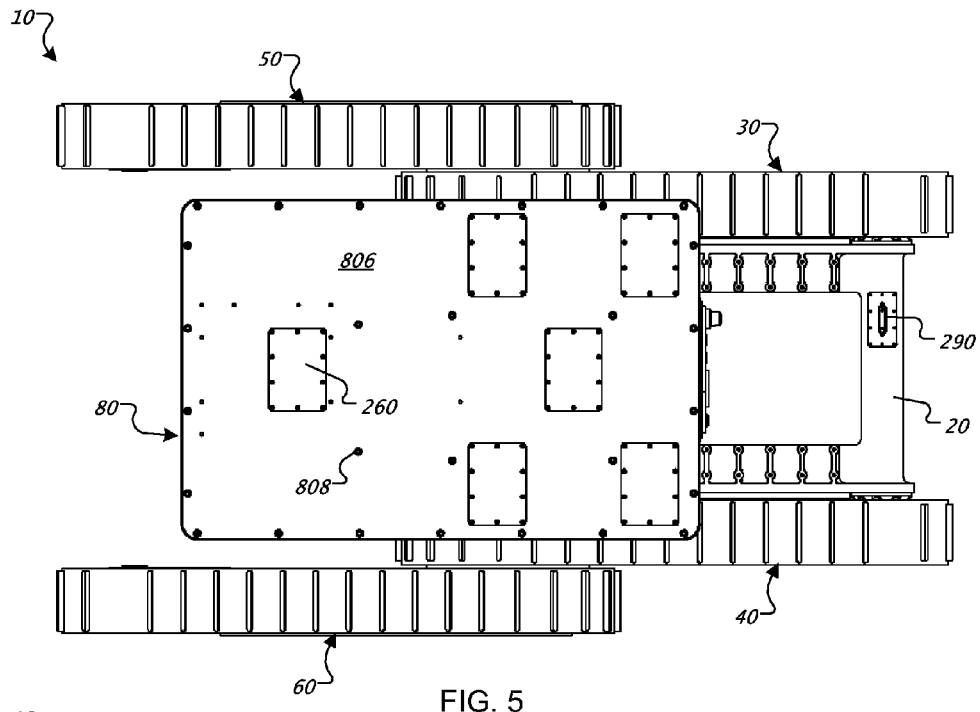
FIG. 5 is a top view of the robotic vehicle.

In some implementations, robotic vehicle 10 tows a trailer connected to rear payload connector 290, as shown in FIG. 5. Exemplary payloads for the trailer include a small generator, which significantly extends both range and mission duration of robotic vehicle, field equipment, and additional functional payload units 500 attachable to the payload deck assembly 80.

The payload deck assembly 80 accepts the mounting of one or more functional payload modules 500 that may include robotic arms, chemical, biological and radiation detectors, and a sample container. The robotic vehicle 10 automatically detects the presence and type of an installed functional payload 500 upon start-up. Referring to FIG. 5, the payload deck 806 defines threaded holes 808 to accept a functional payload 500. FIG. 5 also illustrates one or more functional payload connection pads 810 positioned on the payload deck assembly 80 to accommodate selective connection of multiple functional payload units 500. Each functional payload connection pad 810 delivers power, ground and communications to a functional payload unit 500. For example, robotic vehicle 10 may provide up to 300 W (threshold), 500 W (goal) of power to a payload 500 at 42V, up to 18 A. The communication link may include Ethernet link communications. In one example, payload deck assembly 80 constitutes between about 30 and 70 percent of the vehicle's total weight. The payload deck assembly 80 further includes a removable controller unit 350 operably connected to a drive system (e.g. the motor drivers 36, 46) of the chassis 20. The robotic vehicle 10 communicates with an operator control unit (OCU) through optional communication functional payload module(s) 500. The robotic vehicle 10 is capable of accepting and communicating with a radio functional payload module 500.

Figure 10:
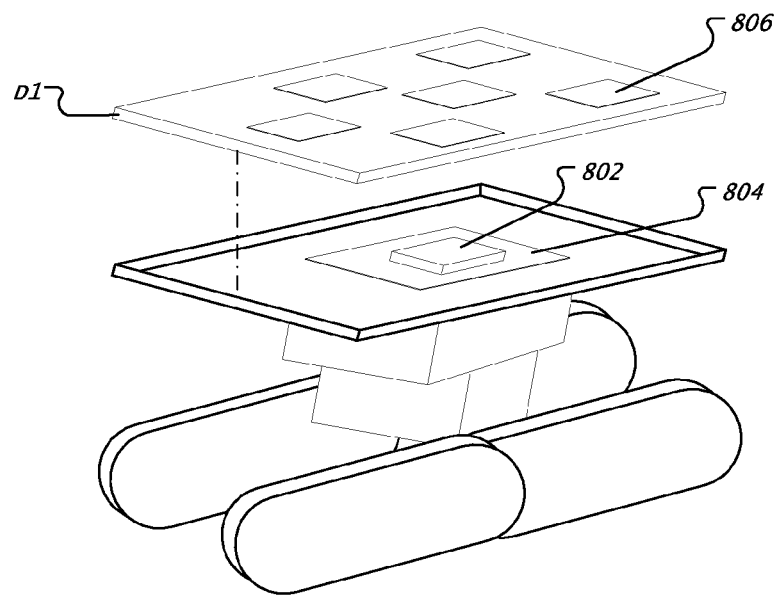
FIG. 10 is a perspective view of a payload deck for a robotic vehicle.
Figure 11:
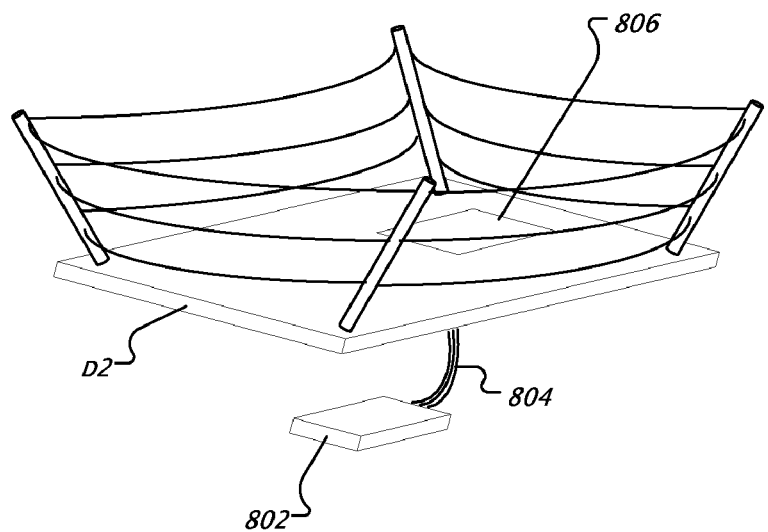
FIG. 11 is a perspective view of a payload deck for a robotic vehicle.
Figure 12:
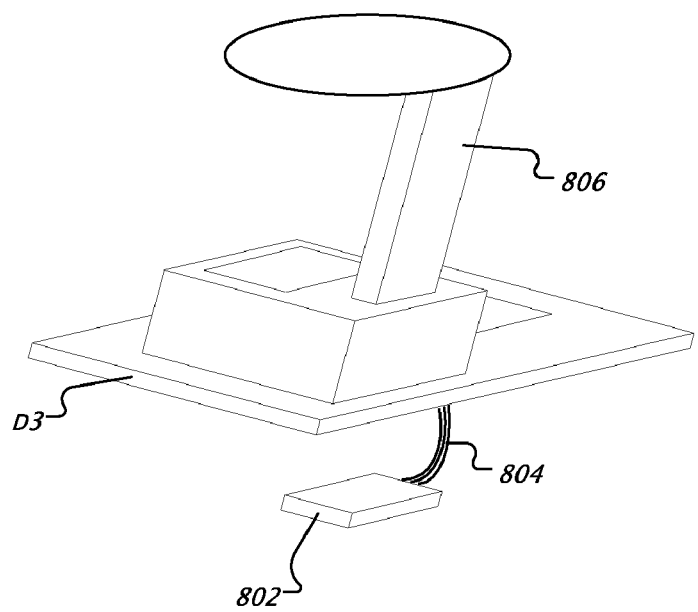
FIG. 12 is a perspective view of a payload deck for a robotic vehicle.
Figure 17:
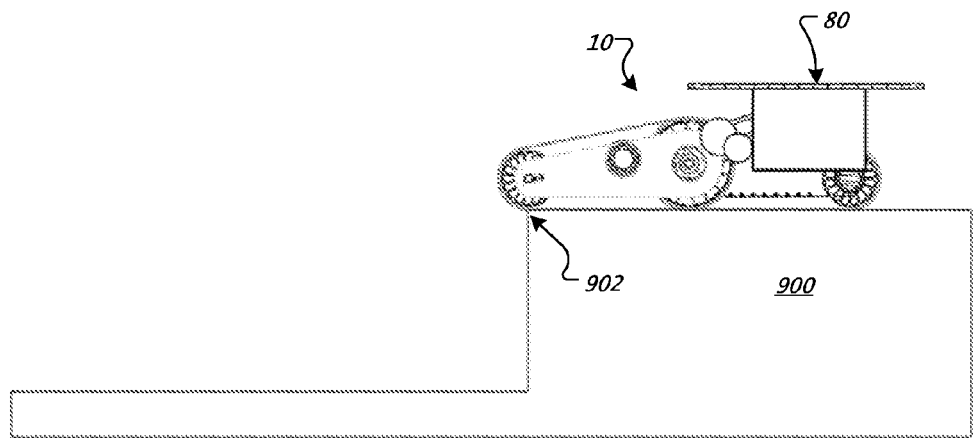
Figure 18:
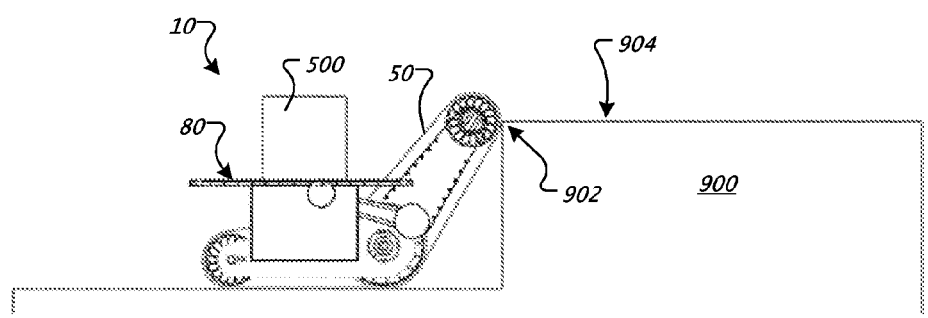
FIGS. 18-21 are side views of a robotic vehicle climbing.
Figure 19:
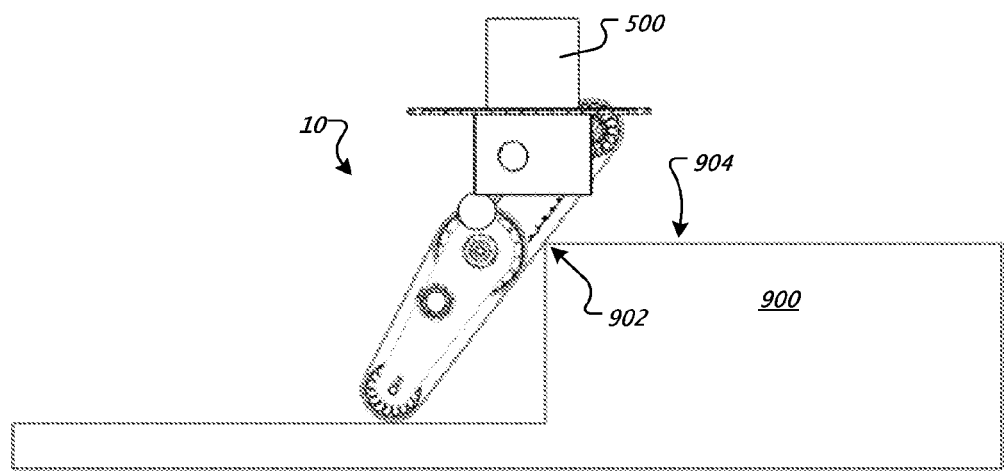
Figure 20:
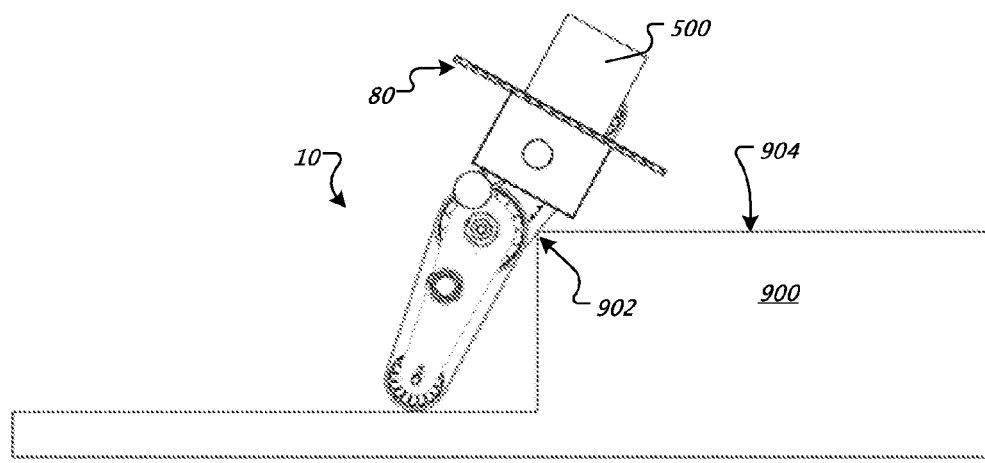
Figure 21:
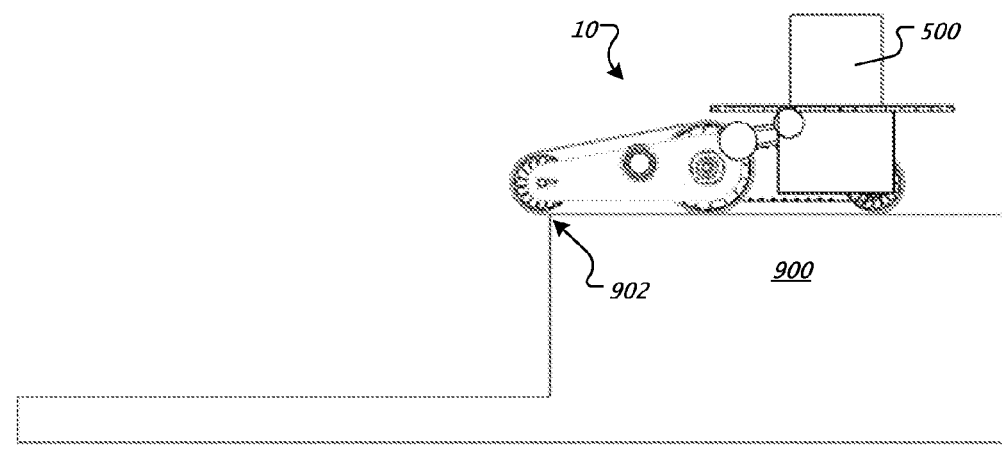

Referring to FIGS. 10-12, modular decks D1, D2, D3 are removable payload decks 806 modularly secured to the electronics bin 90 to form the payload deck assembly 80. The modular decks D1, D2, D3 maintain connectivity to functional payloads 500 located on the decks D1, D2, D3 while allowing interchangeability with a payload deck assembly base 805. The modular decks D1, D2, D3 receive power and communication from a deck connector 802 attached by a wiring harness 804. FIG. 17 depicts a development deck D1 including sparsely spaced connector pads 806. FIG. 18 depicts a mule deck D2 including netting 808 for carrying loads and at least one connector pad 806. FIG. 19 depicts a manipulator deck D3 including an integral bracing 810 for a large manipulator arm. The integral bracing 810 housing at least one connector pad 806. The connectors pads 806 available on the decks D1, D2, D3 each carry 42V, up to 18 A power; ground; and Ethernet, for example. FET switches connected to each connector pad 806 are overload protected and are controlled by a digital signal processor (DSP) on the deck to distribute power. The DSP is controlled via a controller area network (CAN) bus, a known industrial and automotive control bus.

Figure 13:
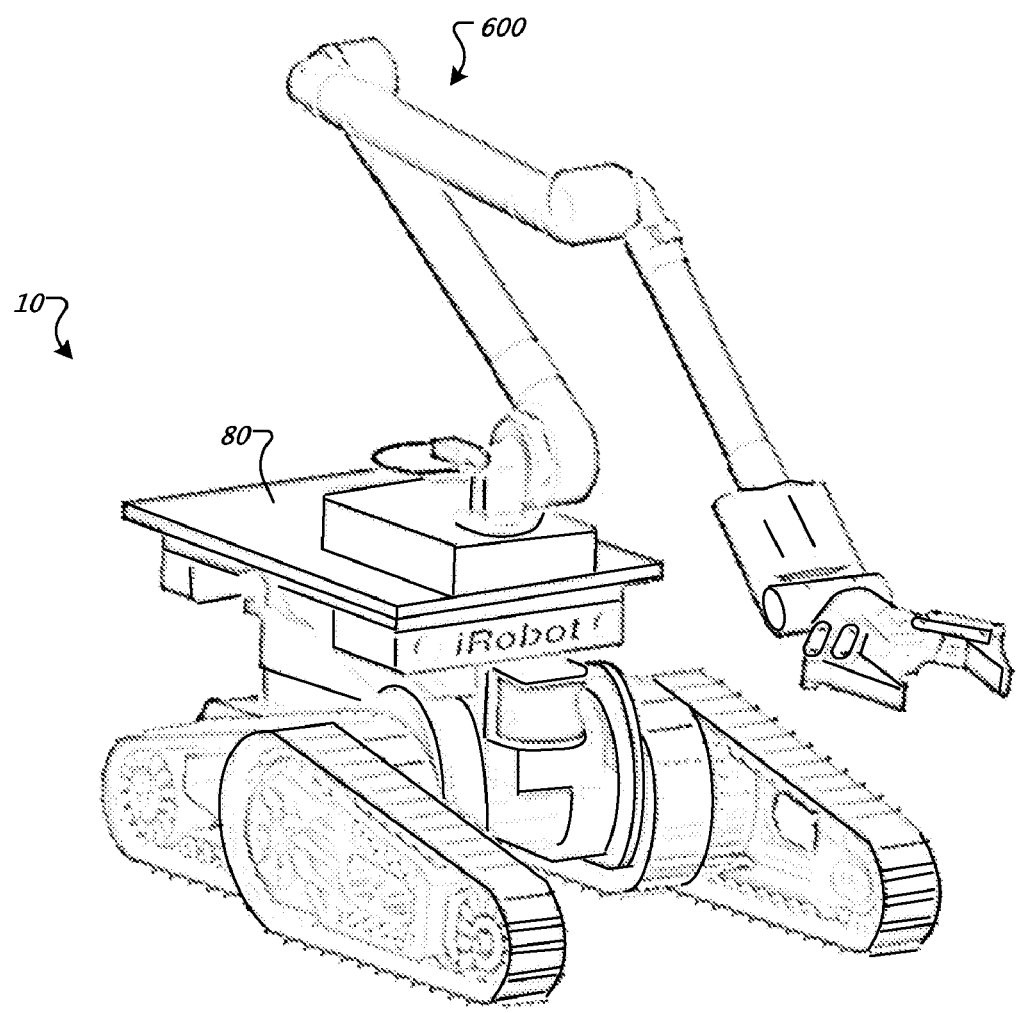
FIG. 13 is a perspective view of the robotic vehicle with a manipulator arm.

FIG. 13 illustrates a robotic arm module 600 as a functional payload 500 attached to the payload deck assembly 80. The robotic arm module 600 provides full hemispherical reach (or more, limited only by interference; or less, limited by other needs of the robot 10) around the robotic vehicle 10. The robotic arm module 600 provides lifting capacity and an additional means for shifting the robotic vehicle's center of gravity 450 forward, e.g. when ascending steep inclines, and rearward, e.g. for additional traction.

The robotic vehicle 10 may sense elements of balance through the linkage 70 (e.g., via motor load(s), strain gauges, and piezoelectric sensors), allowing an operator or autonomous dynamic balancing routines to control the center of gravity 410 of the payload deck assembly 80 and the center of gravity 430 of the linkage 70 for enhanced mobility, such as to avoid tip over while traversing difficult terrain.

Figure 14:
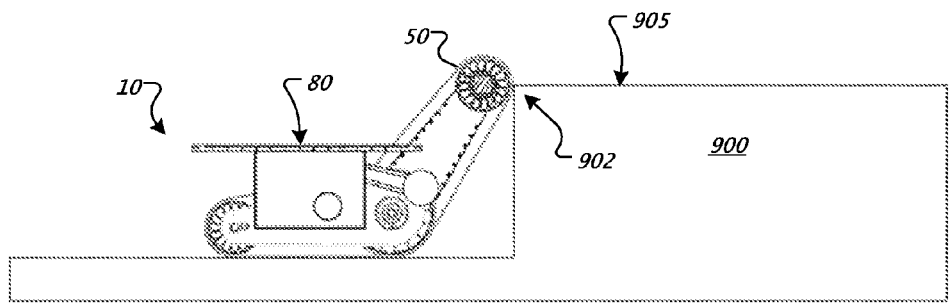
FIGS. 14-17 are side views of a robotic vehicle climbing.
Figure 15:
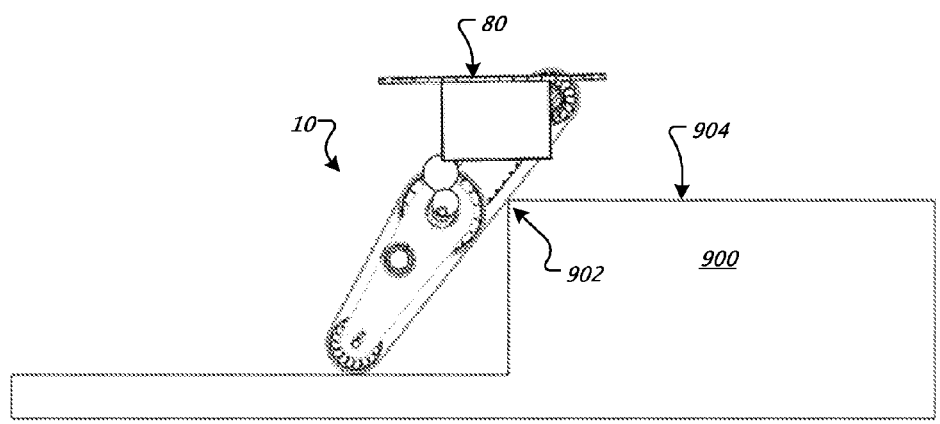
Figure 16:
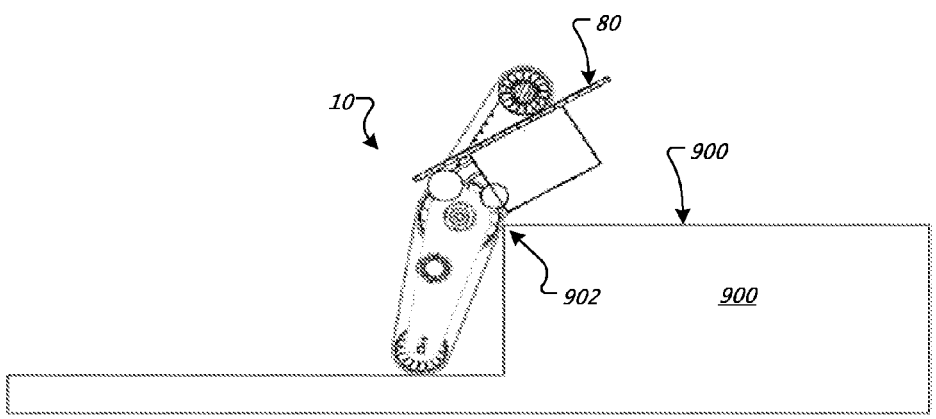

FIGS. 14-17 illustrate the robotic vehicle 10 climbing a step by using the independently controllable pivot drivers 72 and 74 to control both fore-aft position and pitch orientation of the payload deck assembly 80 with respect to the chassis 20 to selectively displace the center of gravity 410 of the payload deck assembly 80 both forward and rearward of the center of gravity 400 of the chassis 20. Referring to FIG. 14, in step S1, the robotic vehicle 10 initiates step climbing by pivoting the first and second flippers 50 and 60, respectively, upward to engage the edge 902 of the step 900. The robotic vehicle 10 also positions the center of gravity 410 of the payload deck assembly 80 above the front end of chassis 20. Next, as shown in FIGS. 15-16, in steps S2 and S3, the robotic vehicle 10 pivots the first and second flippers 50 and 60 downward on the edge 902 of the step 900 to engage the top 904 of the step and drives forward. In FIG. 15, illustrating step S2, the payload deck assembly 80 is further tilted to advance the center of gravity 450 of the robot 10 (permitting higher obstacles to be climbed). In step S3, the robotic vehicle 10 continues to displace the center of gravity 410 of the payload deck assembly 80 beyond the front of the chassis 20, as shown in FIG. 16, by rotating both the first and second pivots, 71 and 73 respectively. Finally, in step S4, as shown in FIG. 17, the robotic vehicle 10 drives forward to pull the chassis 20 over the edge 902 of the step 900. FIGS. 18-21 illustrates the robotic vehicle 10 initiating and completing steps S1-S4 for obstacle climbing with a functional payload 500 secured to the payload deck assembly 80.

Figure 22:
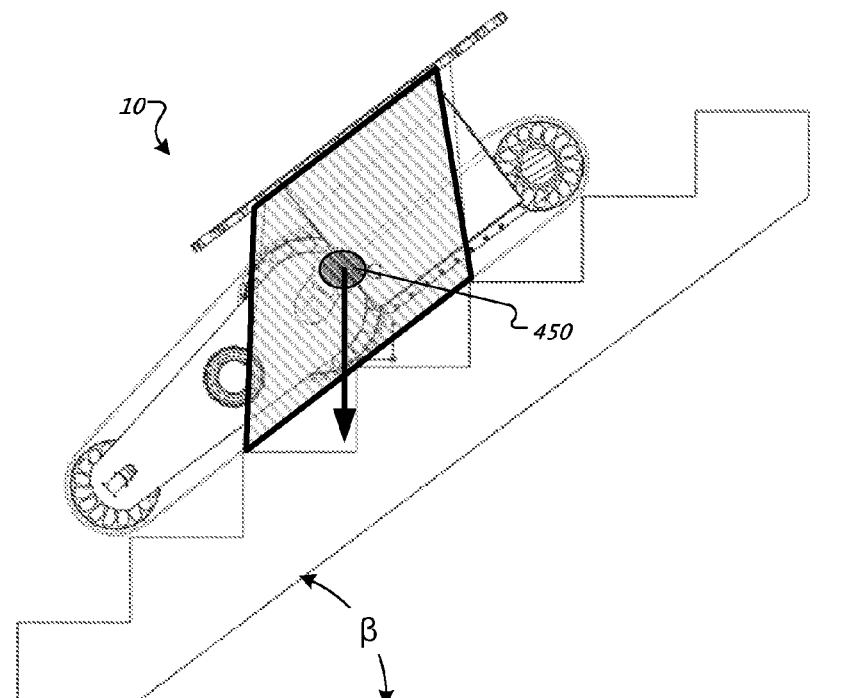
FIG. 22 is a side view of a robotic vehicle climbing stairs.
Figure 23:
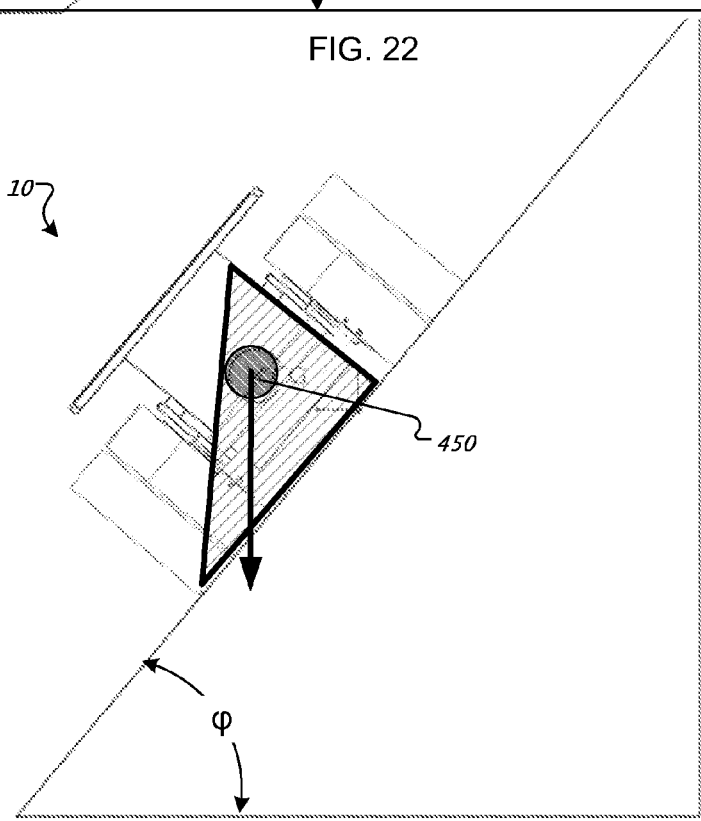
FIG. 23 is a front view of a robotic vehicle traversing an incline.

In some implementations, the robotic vehicle 10 is configured to negotiate obstacles, curbs and steps having a height of about 0.3 m (12 inches), and across a horizontal gap of about 0.61 m (24 inches). The robotic vehicle 10 has side-to-side horizontal dimensions smaller than standard exterior doorways (e.g. 32 inches) and interior doors (e.g. 30 inches). Referring to FIGS. 22-23, the robotic vehicle 10 is configured as to ascend and descend a flight of stairs having up to a climb angle, $\beta$, of about 37 degrees, as well as climb and descend an inclined slope, including stopping and starting, on a hard dry surface slope angle, $\beta$, of about 50 degrees. Similarly, the robotic vehicle 10 is physically configured as described herein to climb and descend, including stopping and starting, an inclined grass covered slope having an angle, $\beta$, of about 35 degree grade. The robotic vehicle 10 is configured to laterally traverse, including stopping and starting, on a grass slope angle, $\phi$, of about 30 degrees. Furthermore, the robotic vehicle 10 is configured to maneuver in standing water (fresh/sewage) having a depth of about 0.3 m (12 inches) and maintain a speed of about 20 kph (12 mph) on a paved surface, and about 8 kph (5 mph) through sand and mud.

The robotic vehicle 10 supports assisted teleoperation behavior, which prevents the operator from hitting obstacles while using on board obstacle detection/obstacle avoidance (ODOA) sensors and responsive ODOA behaviors (turn away; turn around; stop before obstacle). The robotic vehicle 10 assumes a stair climbing pose, as illustrated in FIG. 13, or a descending preparation pose (similar to the pose shown in FIG. 13, but with the flippers 50, 60 pointing downward) when a stair climbing or stair descending assist behavior is activated, respectively. The robotic vehicle 10 stair climbing behaviors can be configured to control (tilt) the flippers 50, 60 and control the position of the center of gravity shifter 70 as the robot 10 negotiates stairs. A stair climbing assist behavior keeps the robotic vehicle 10 on a straight path up stairs and, in one example, may maintain a roll angle of about zero degrees.

The robotic vehicle's 10 control software provides autonomous capabilities that include debris field mapping, obstacle avoidance, and GPS waypoint navigation. The robotic vehicle 10 can determine position via a global positioning system (GPS) receiver, housed in a separate sensor module 500.

The robotic vehicle 10 is fully operational after exposure to a temperature range of about $-40°$ C. to about $71°$ C. ($-40°$ F. to $160°$ F.) in a non-operating mode and is fully operational in a temperature range of about $-32°$ C. to about $60°$ C. ($-26°$ F. to $140°$ F.). The robotic vehicle operates during and after exposure to relative humidity up to about 80 percent, in varied weather conditions. The robotic vehicle 10 also operates during and after exposure to blowing sand and/or rain, freezing rain/ice, and in snowfall up to about 0.1 m (4 inches) in depth.

Figure 24:
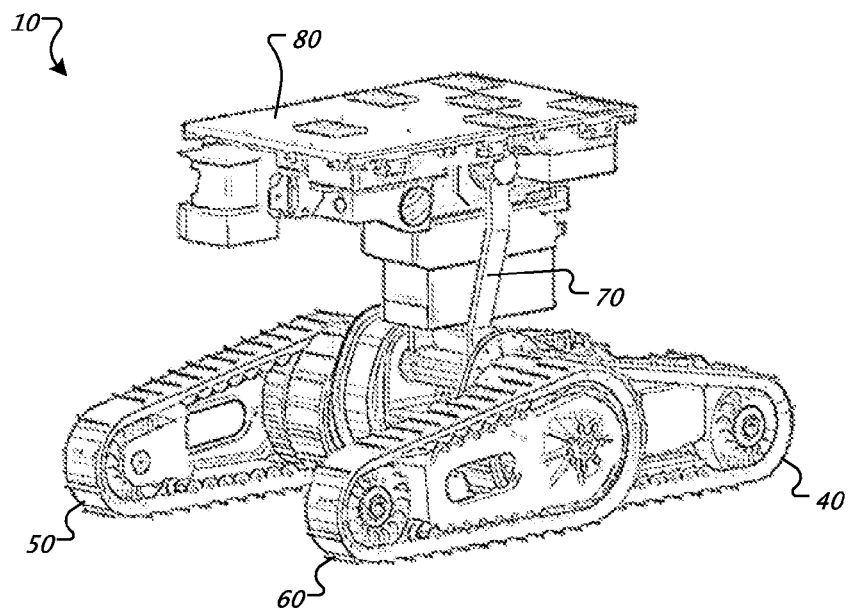
FIG. 24 is a perspective view of a robotic vehicle in a neutral posture.
Figure 25:
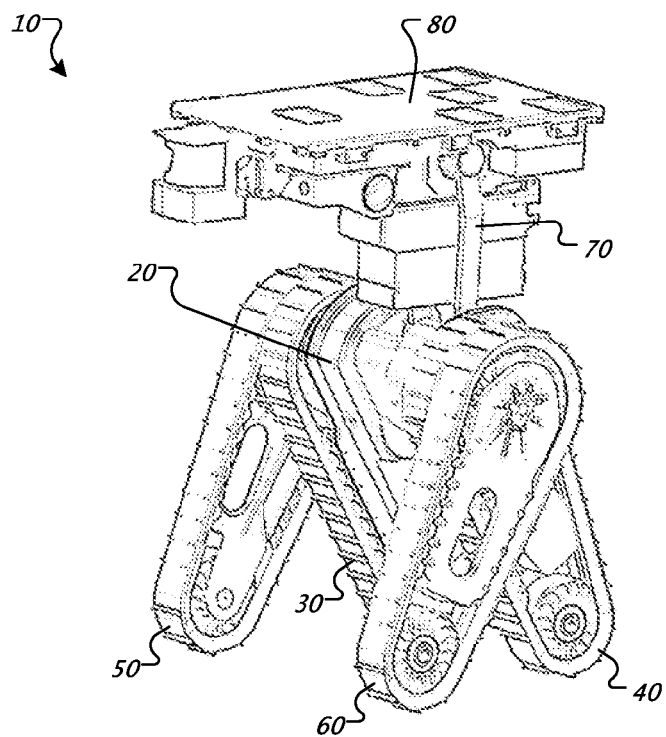
FIG. 25 is a perspective view of a robotic vehicle in a standing posture.
Figure 26:
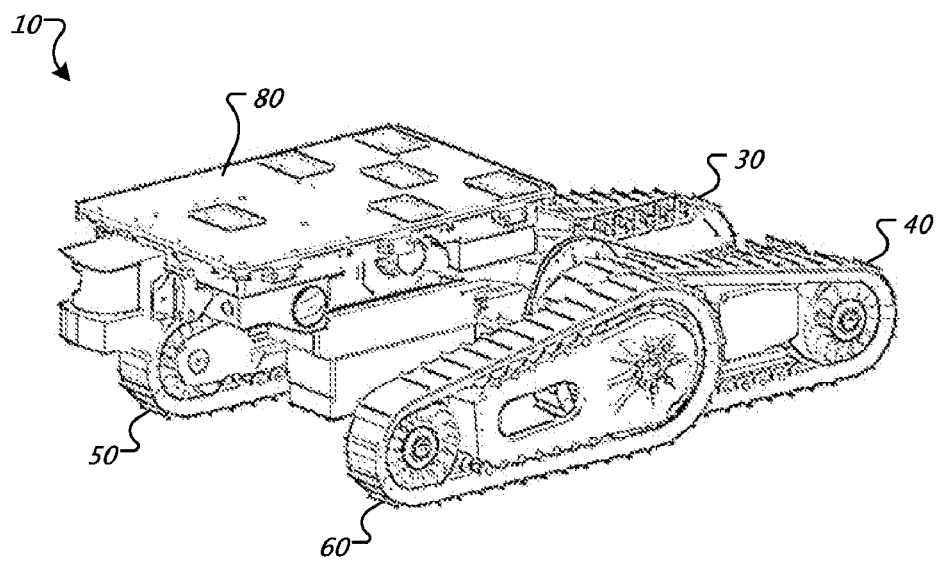
FIG. 26 is a perspective view of a robotic vehicle in a kneeling posture.
Figure 27:
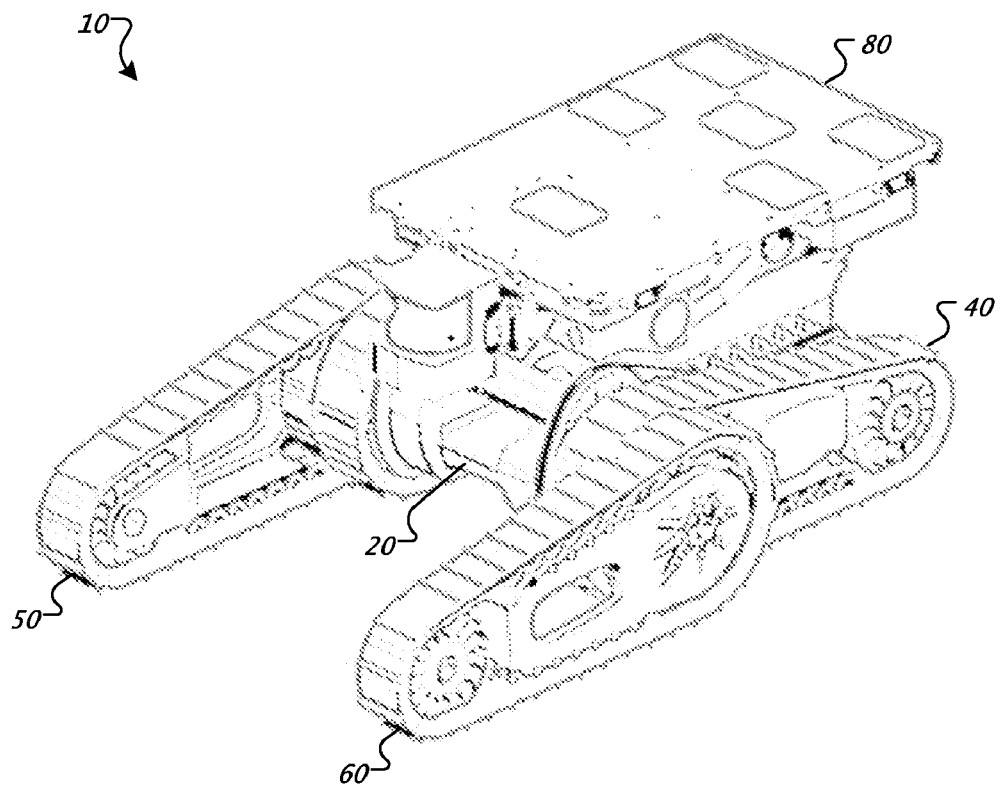
FIG. 27 is a perspective view of a robotic vehicle in a kneeling posture.

Referring to FIGS. 24-28, the robotic vehicle 10 may exhibit a variety of postures or poses to perform tasks and negotiate obstacles. The linkage 70 together with the deck assembly 80, chassis 20, and flippers 50, 60 all move to attain a number of standing postures. FIG. 24 depicts robotic vehicle 10 in a neutral posture. FIG. 25 depicts the robotic vehicle 10 in one standing posture wherein the distal end of flippers 50 and 60 approaches the leading end of the chassis 20 to form an acute angle between the flippers 50 and 60 and the chassis 20. The linkage 70 is entirely above a common axis 15 of the flippers 50 and 60 and the chassis 20. In one example, the deck assembly 80 tilts independently with respect to the robotic vehicle 10. The acute angle achieved between the flippers 50 and 60 and the chassis 20 varies the standing positions without changing the orientation of the deck assembly 80 with respect to the ground. In some examples, the linkage 70 is positionable at least parallel to an imaginary line between the distal and pivot ends of flippers 50 and 60. In additional examples, the second end 70B of the linkage 70 is positionable below an imaginary line between the distal and pivot ends of flippers 50 and 60. In another implementation, the linkage 70 together with the deck assembly 80, chassis 20, and flippers 50 and 60 can move to attain a first kneeling position, as shown in FIG. 26, and a second kneeling position, as shown in FIG. 27.

Figure 28:
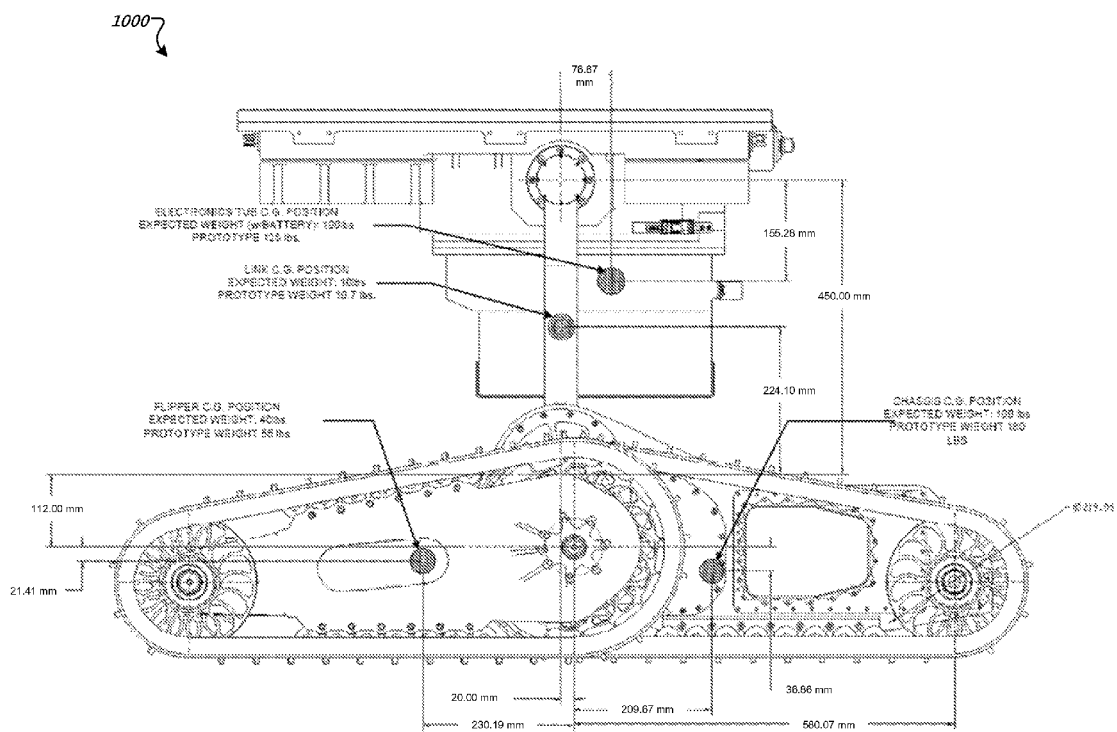
FIG. 28 is a side view of a robotic vehicle.

FIG. 28 illustrates an implementation of centers of gravity of a robotic vehicle 1000 and distances between them. The locations of the centers of gravity within the chassis 20, deck 80, linkage 70, and flippers 50 and 60 and with respect to each other individually may be varied to attain a number of advantages in terms of maneuverability and the ability to perform certain tasks.

There are several advantages to the present "two-bar" linkage 70 (having independent, powered pivots 71, 73 at the deck assembly end 70B and the chassis end 70A of the linkage 70) with respect to other structures for shifting a center of gravity.

For example, a robot equipped with a "two-bar" linkage 70 can scale higher obstacles relative to a robot without such a linkage. In order to do so, the deck assembly 80 is tilted and/or pivoted further forward, moving the overall center of gravity 450 higher and farther forward. A robot equipped with the two-bar linkage 70 can scale higher obstacles when bearing a payload 500 on top of the deck assembly 80 than without a payload 500. A high, heavy payload 500 can be tipped with the two-bar linkage 70 to provide a more pronounced shift of the center of gravity 450 forward than an empty deck assembly 80. The two bar linkage 70 may raise the deck assembly 80 and an attached a sensor pod module 500 higher in a standing position, as shown in FIG. 25, even with a level deck, because the linkage 70 is connected at one point 73 at the top of the range and also at one point 71 at the bottom of the range. This is valuable because the linkage 70 may place a sensor such as a camera, perception sensor (e.g., laser scanner) or payload sensors 500 relatively higher. Other linkage systems may require connection at more than one point, which may limit the height and/or may also tilt the deck assembly 80 at the highest position while in the standing position.

A two bar linkage 70 has a theoretical pivot range, limited only by interference with other parts of the robot, of greater than 180 degrees. If positioned concentrically with the flipper-chassis joining axis 15, the linkage rotation range could be 360 degrees. Other constraints designed herein and other advantages obtainable in other positions can change this. For example, if the first pivot 71 of the linkage 70 is positioned above and forward of the common chassis-flipper axis 15 (e.g., about 20 mm forward and about 70 mm above), it is possible to have a unitary structure for the chassis 20 (casting).

A straight shaft may join both flippers 50,60 directly, allowing the bottom pivoting actuator 72 to be placed off center with the flipper actuator 55. Additional pivot range past 180 degrees may be obtained, as with additional standing height, by increasing the distance between the first pivot 71 and the common chassis-flipper axis 15.

Other systems may have a range of considerably less than 180 degrees, for example if the parts of such systems are limited in a pivoting or movement range by interference among the system members. Still further, a two bar linkage has a longer effective forward extending range, since the linkage 70 is substantially stowable to the chassis 20. The distance between more than one chassis connections of the other systems may shorten the effective forward extending range. As one additional advantage, a deck-side actuator 74 of the two-bar linkage 70 can be used to "nod" (auxiliary scan) a scanning (main scanning) sensor such as a 2D LADAR or LIDAR to give a 3D depth map.

A significant problem is one of discovering or creating synergy in the design of the robot's functional morphology in the 200-500 lb range (e.g., 200-300 lb. plus 100-200 lbs of optional payload). There are many factors to balance to generate synergy, but for the purpose of the present discussion, the number will be limited to some directly affecting the shape and arrangement of the robot.

In a robot designed for sensitive environments, especially military robots, electromagnetic (EM) emissions should be limited to as little as possible. For example, EM emissions should be controlled to reduce the possibility of triggering EM-sensitive triggers on explosive devices; and to increase the EM "stealth" of the robot.

In a robot using enough energy to move 250 lbs at reasonable speed, heat generated in batteries, motors, motor drivers/amplifiers, and high-stress mechanicals must be safely and effectively dispersed. Preferably, heat sinks do not make up a significant portion of the robot weight.

In a robot intended for effective and efficient use with depot-level maintenance and flexible logistics, high-stress, sensitive, and frequently replaced, refurbished, or rebuilt parts should be readily accessible. This can directly compete with an equally important emphasis on interchangeable or modularly interchangeable parts.

In a robot intended for flexible use in harsh environments, as many cables, lines, wires, etc. as possible should be internal to the casing(s) of the robot. Housings and the like should be environmentally or hermetically sealed, either simply waterproof or made more immersible (e.g., under positive internal pressure). Sufficient sealing of housings, cablings, transmissions, and the like can permit a robot to be submersible.

Further, interference or occlusion among moving parts, static parts, and sensor fields of view preferably do not prevent the robot from accomplishing any mission for which it was designed. More particularly, a main chassis, shifting body or load for shifting CG, and drive tracks have a certain volume within which they operate, and as little volume as possible (outside these bodies) should be filled with motive drive elements.

Figure 29:
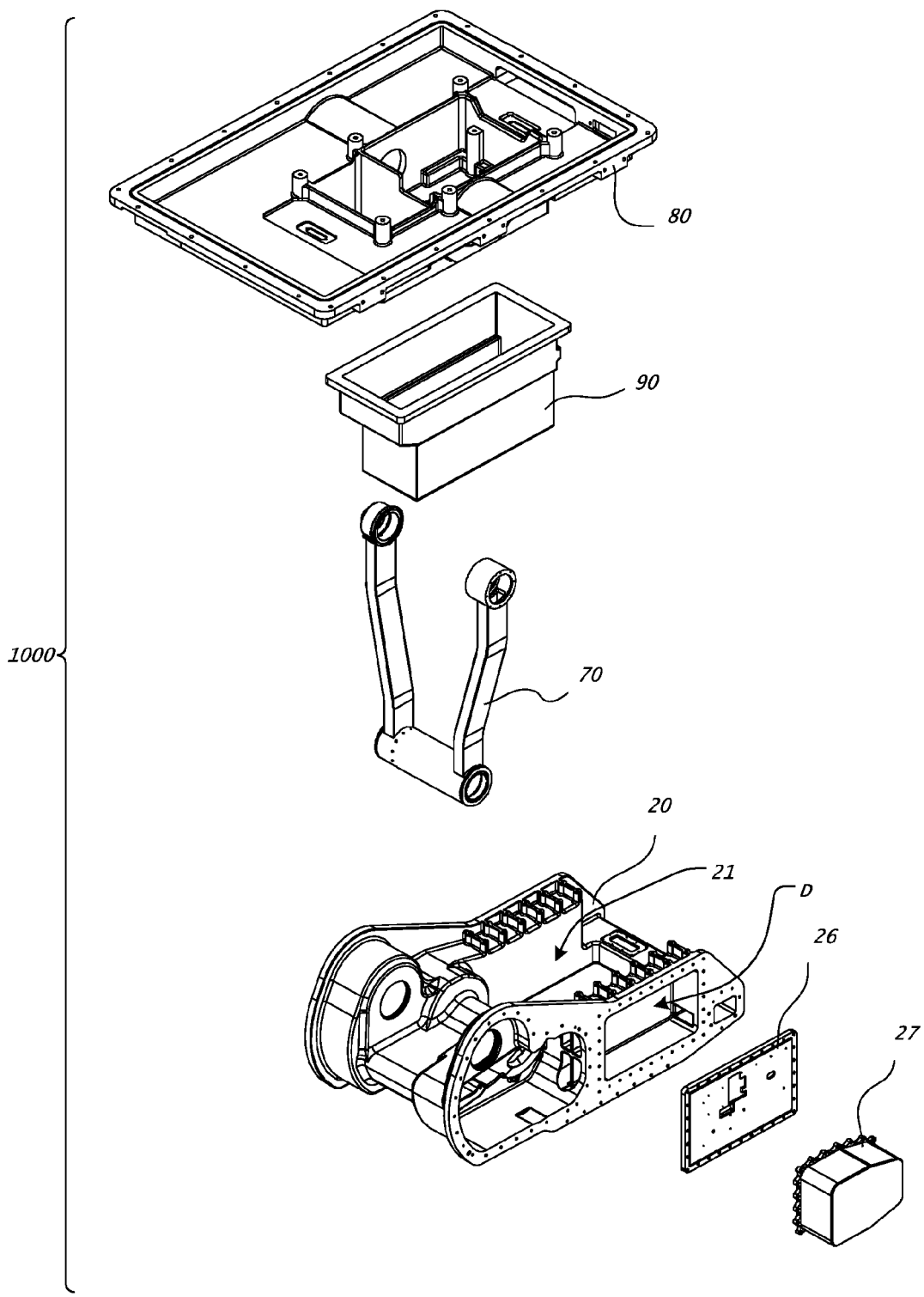
FIG. 29 is a partially exploded view of a large skid-steered robotic vehicle.

FIG. 29 provides a partially exploded view of an implementation of a large skid-steered robot 1000 having a shiftable CG load 510 connected to the chassis 20 by a sealed linkage 70 driven at chassis end 70A and driven at the distal (load) end 70B. The shiftable load 510, including a battery box 92 and tilt motor 73, can move rearward to occupy a free space 21 shown in the middle of the chassis 20 ("Chassis free space").

Figure 30:
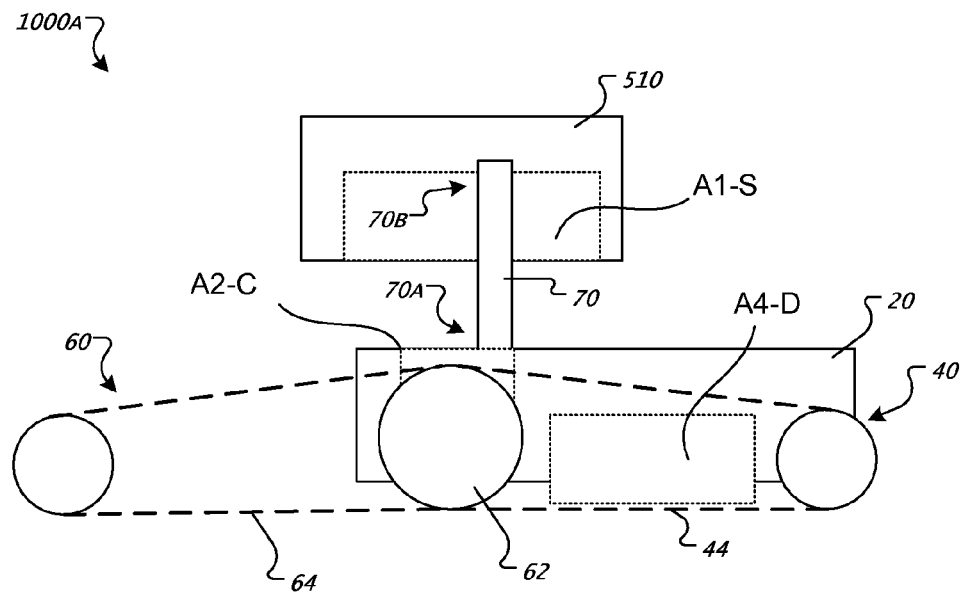
FIG. 30 is a schematic side view of a large skid-steered robotic vehicle.
Figure 31:
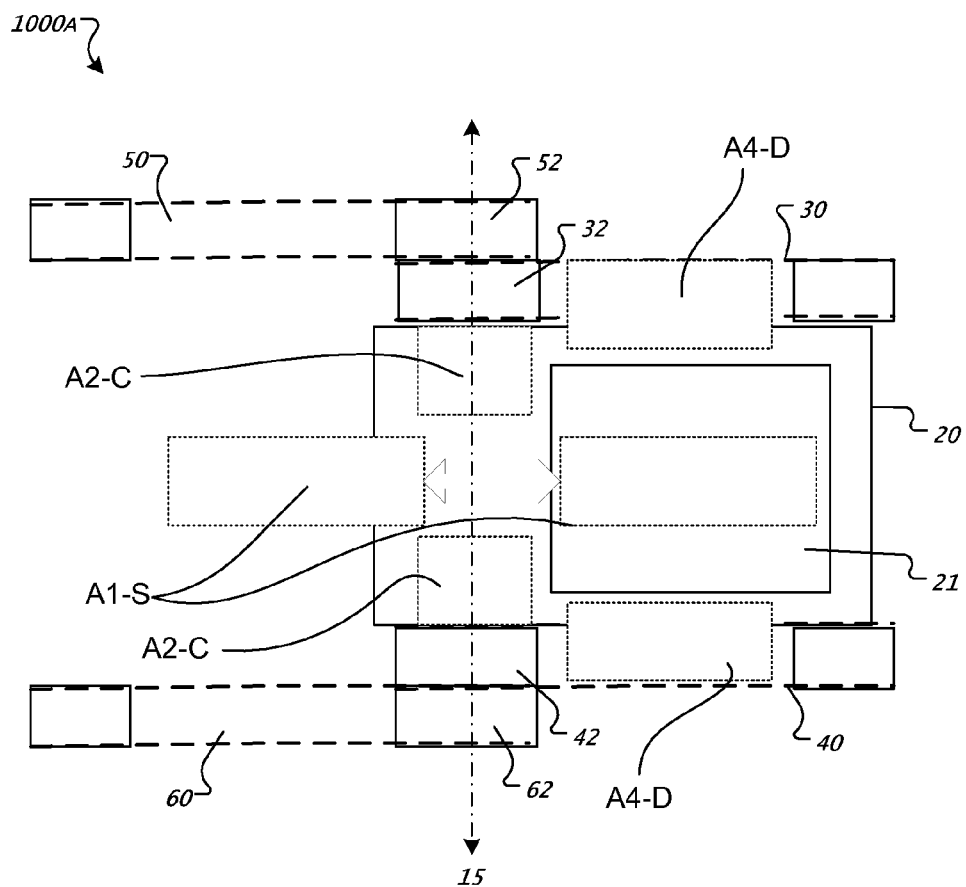
FIG. 31 is a schematic top view of a large skid-steered robotic vehicle.

FIGS. 30-31 show, respectively, schematic side and top views of an implementation of a large skid-steered robot 1000A having a chassis 20 supported on right and left drive track assemblies, 30 and 40 respectively, having driven tracks, 34 and 44 respectively. Each driven track 34, 44, is trained about a corresponding front wheel, 32 and 42 respectively, which rotates about front wheel axis 15. Right and left flippers 50 and 60 are disposed on corresponding sides of the chassis 20 and are operable to pivot about the front wheel axis 15 of the chassis 20. Each flipper 50, 60 has a driven track, 54 and 64 respectively, about its perimeter that is trained about a corresponding rear wheel, 52 and 62 respectively, which rotates about the front wheel axis 15. A shiftable center of gravity (CG) load 510 is connected to the chassis 20 by a sealed linkage 70 driven at a chassis end 70A and driven at a distal (load) end 70B. The shiftable load 510 can tilt (via a tilt motor 73 in the load in this implementation, but other implementations may employ a chassis-mounted motor) and can move rearward to occupy a free space 21 in the middle of the chassis 20 ("Chassis free space") rear of the drive wheels 32, 42, structurally surrounded by some chassis elements, and can shift (e.g., swing) or otherwise move forward through free space 21 forward of the chassis 20 and forward of the drive wheels 32, 42. Motive power elements that generate potentially problematic excess heat (e.g., motors 36, 46, 72, 74, motor drivers and amplifiers, and batteries 92) are located within the tracks 30, 40 of the main drive, within the chassis 20 adjacent the main drive wheels 32, 42, and within the shiftable CG load 510. As shown in FIG. 31, the location S within the shiftable load 510 of motive power element A1 is shiftable front to rear to move the center of gravity of the entire robot 1000A. This configuration does not include a motive power element in the front flipper volume.

Figure 32:
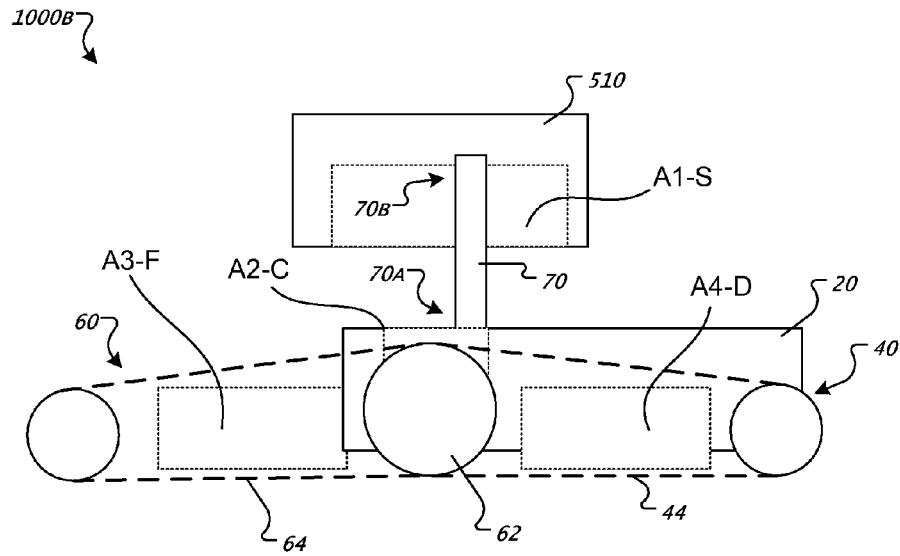
FIG. 32 is a schematic side view of a large skid-steered robotic vehicle.
Figure 33:
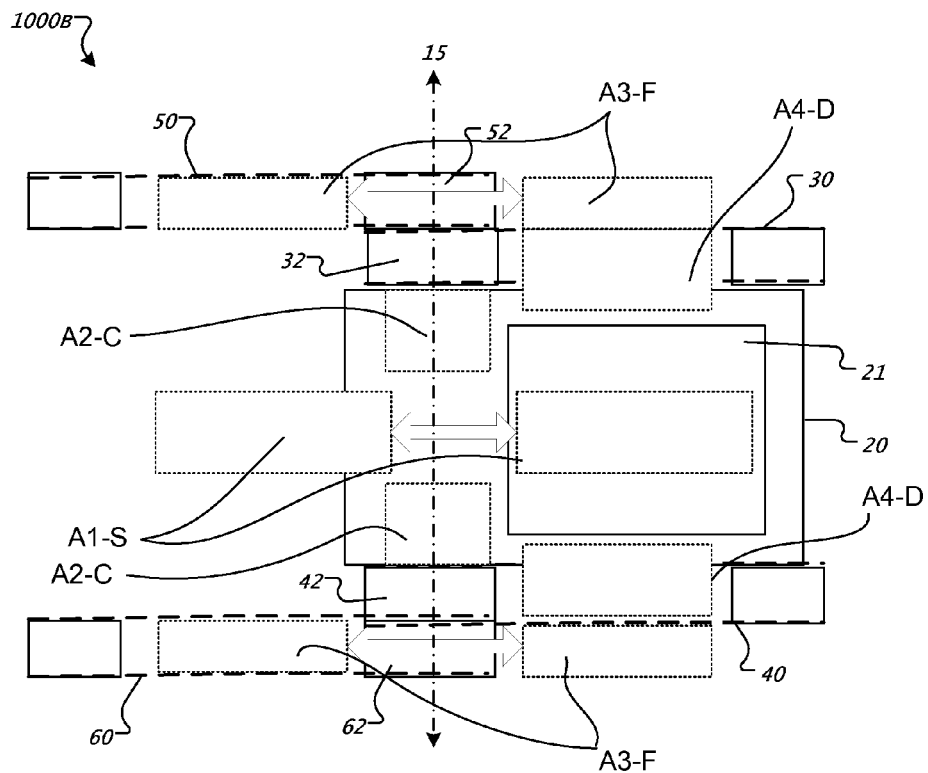
FIG. 33 is a schematic top view of a large skid-steered robotic vehicle.

FIGS. 32-33 show, respectively, schematic side and top views of an implementation of a large skid-steered robot 1000B having a chassis 20 supported on right and left drive track assemblies, 30 and 40 respectively, having driven tracks, 34 and 44 respectively. Each driven track 34, 44, is trained about a corresponding front wheel, 32 and 42 respectively, which rotates about front wheel axis 15. Right and left flippers 50 and 60 are disposed on corresponding sides of the chassis 20 and are operable to pivot about the front wheel axis 15 of the chassis 20. Each flipper 50, 60 has a driven track, 54 and 64 respectively, about its perimeter that is trained about a corresponding rear wheel, 52 and 62 respectively, which rotates about the front wheel axis 15. A shiftable center of gravity (CG) load 510 is connected to the chassis 20 by a sealed linkage 70 driven at a chassis end 70A and driven at a distal (load) end 70B. The shiftable load 510 can tilt and can move rearward to occupy a free space 21 in the middle of the chassis 20 ("Chassis free space") rear of the drive wheels 32, 42, structurally surrounded by some chassis elements, and can swing or otherwise move forward through free space 21 forward of the chassis 20 and forward of the drive wheels 32, 42. Motive power elements that generate potentially problematic excess heat (e.g., motors 36, 46, 72, 74, motor drivers and amplifiers, and batteries 92) are located within the tracks 30, 40, 50, 60 of the main drive, within the chassis 20 adjacent the main drive wheels 32, 42, in the front flipper volume, and within the shiftable CG load 510. As shown in FIG. 33, the location S within the shiftable load of motive power element A1 is shiftable front to rear to move the center of gravity of the entire robot 1000B; and the location F within the shiftable front flippers 50, 60 is shiftable front to rear to move the center of gravity of the entire robot 1000B. The depicted arrows show these shiftable loads at both ends of their movement range.

Figure 34:
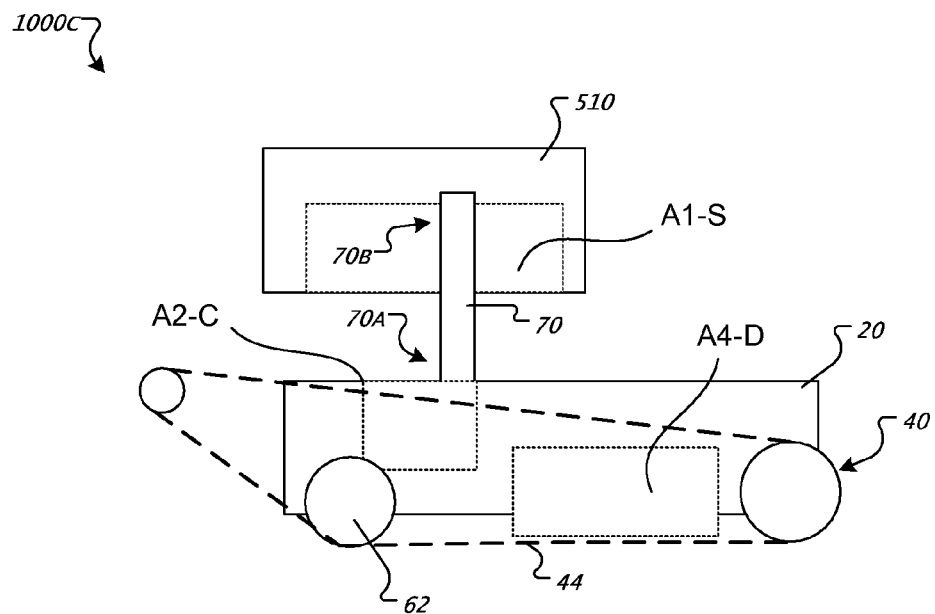
FIG. 34 is a schematic side view of a large skid-steered robotic vehicle.
Figure 35:
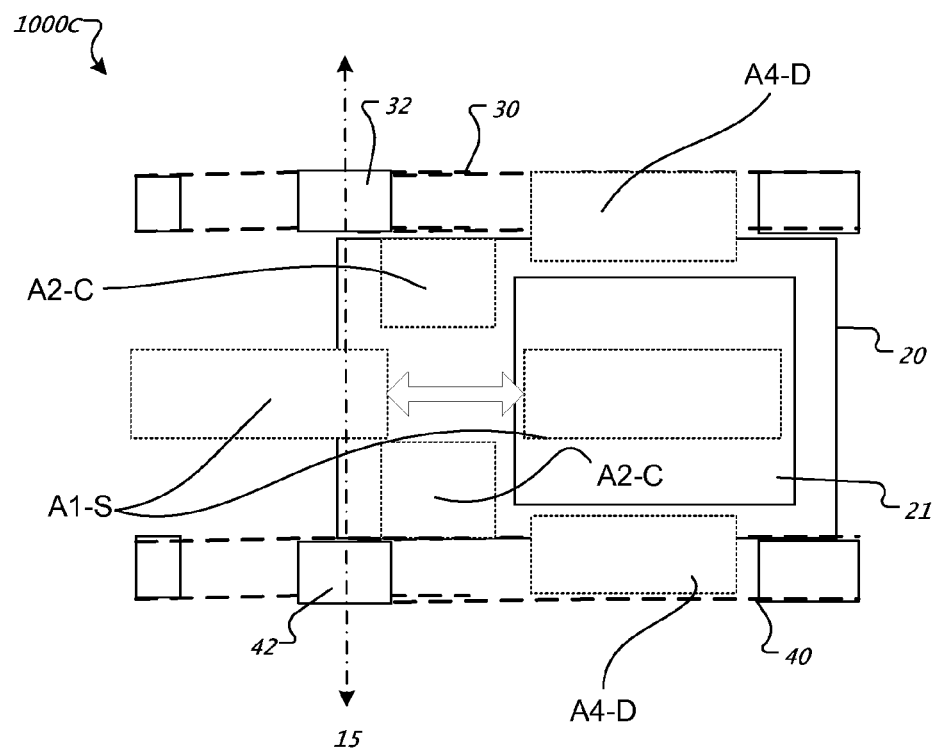
FIG. 35 is a schematic top view of a large skid-steered robotic vehicle.
Figure 37A:
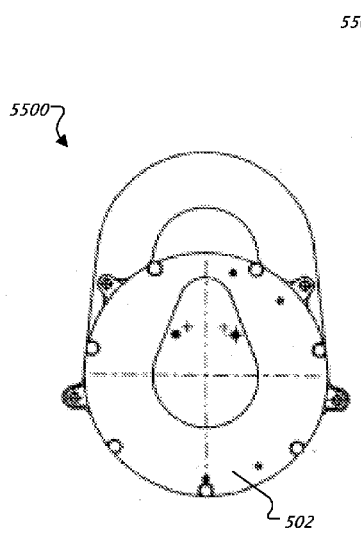
FIG. 37A is a top view of a drive module.
Figure 37B:
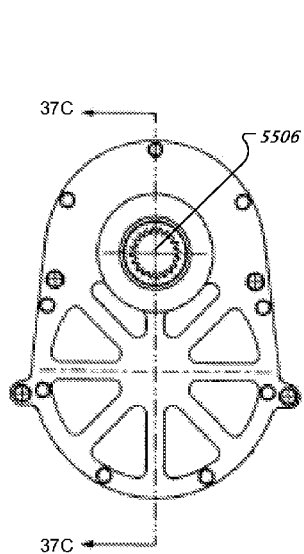
FIG. 37B is a bottom view of a drive module.
Figure 37C:
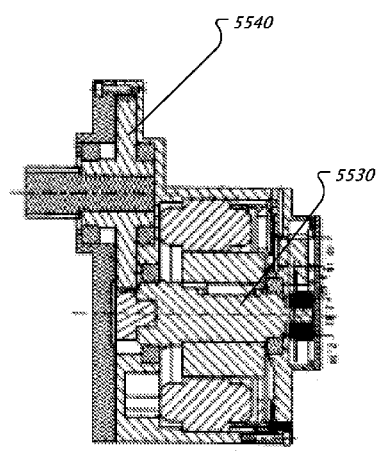
FIG. 37C is a sectional view of a drive module.
Figure 37D:
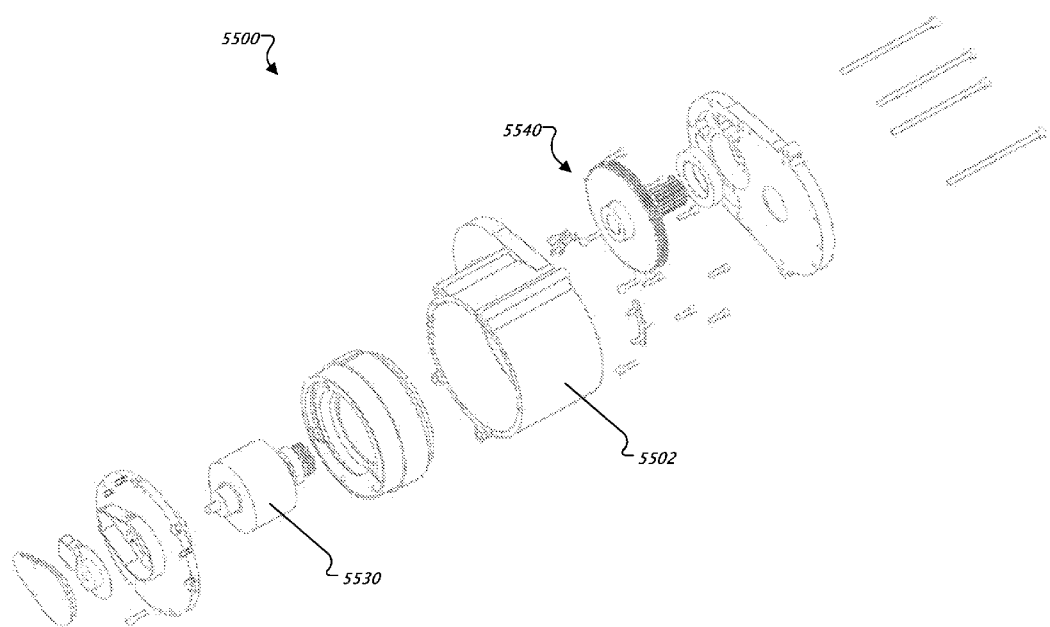
FIG. 37D is an exploded view of a drive module.

FIGS. 34-35 show, respectively, schematic side and top views of an embodiment of a large skid-steered robot 1000C having a chassis 20 supported on right and left drive track assemblies, 30 and 40 respectively, having driven tracks, 34 and 44 respectively. Each driven track 34, 44, is trained about a corresponding front wheel, 32 and 42 respectively, which rotates about front wheel axis 15. A shiftable center of gravity (CG) load 510 is connected to the chassis 20 by a sealed linkage 70 driven at a chassis end 70A and driven at a distal (load) end 70B. The shiftable load 510 can tilt and can move rearward to occupy a free space 21 in the middle of the chassis 20 ("Chassis free space") rear of the drive wheels 32, 42, and structurally surrounded by some chassis elements. The shiftable load 510 can also swing or otherwise move forward through free space 21 forward of the chassis 20 and forward of the drive wheels 32, 42. Motive power elements that generate potentially problematic excess heat (e.g., motors 36, 46, 72, 74, motor drivers and amplifiers, and batteries 92) are located within the tracks 30, 40 of the main drive, within the chassis 20 adjacent the main drive wheels 32, 34, and within the shiftable CG load 510. As shown in FIG. 35, the location S within the shiftable load of motive power element A1 is shiftable front to rear to move the center of gravity of the entire robot 1000C. This configuration does not include flippers 50, 60 as FIGS. 30-33, but may include other kinds of tracks or wheels configured to overcome forward or rearward obstacles.

A feature of the robotic vehicle 10, 1000, 1000A, 1000B, 1000C is the placement of a motive power element A4 as shown in FIGS. 30-35 (battery, motor, motor driver amplifier). This element typically generates significant waste heat (e.g., at least 5% losses to heat), produced by parts such as motor drivers and amplifiers, at least partially within the volume D (in "A4-D") of the main tracks, and also either directly next to the main chassis 20 or substantially next to the main chassis 20 (for example, via similarly cast and/or machined intervening plate(s) 26 flush-mounted for thermal conduction to the main chassis 20). In some implementations, each of the chassis 20 or intervening plates 26 is made mostly of materials recognized to be structurally robust, light, and useful heat sinks when sufficient surface area and/or volume is available (e.g., thermal conductivities of greater than 50 W/(m·K), and preferably greater than 100 W/(m·K) such as aluminum at 237 W/(m·K) at 300 K, magnesium at 156 W/(m·K) at 300 K, and alloys).

In this location, the heat generated (e.g., at least about 5% losses on 500 W peak, but also up to the same losses or higher on 2 kW peak or higher) is dissipated via the 50-100 lb. chassis. In preferred implementations, the motive power element A4 is readily accessible from the side of the robot 10,1000, and may be serviced readily, any assemblies placed therein being slide-able or translatable in a horizontal direction for removal from the track or drive volume or envelope D. The motive power element A4 is located at least partly within the track/wheel volume D, yet does not impede movement of the tracks 30, 40 or wheels 32, 42; and is located at least partly within the chassis 20, yet does not impede movement of mechanism or load for shifting the center of gravity (e.g., Shift CG load). Very little volume is occupied beyond the volume already necessary for the chassis 20 and tracks/wheels 30, 40, 32, 42 themselves. The motive power element A4 can be sealed against the environment and immersion-proofed (e.g., via a cover 27 and plate 26), as any wiring from the motive power element A4 to another motive power element adjacent the wheels (e.g., A2) is routed within the chassis 20, without necessarily passing through any slip-rings or other moving conductive junctions. Wiring to another motive power element (e.g., A1) via the chassis for shifting the center of gravity is routed within the sealed (e.g., welded, cast, sealed) linkage 70 between chassis 20 and CG-shifting load 510. Because the main track/wheel volume or envelope D is generally symmetrical (left and right sides of the vehicle being mirror-able), the motive power element A4 to be placed within that envelope D may be the same size and shape on each side, which permits an additional functionality in that interchangeable and/or modular assemblies to be used for the motive power element A4 in those two locations.

If the motive power element A4 is a motor driver/amplifier for drive motors 36, 46 adjacent the wheels 32, 52, 42, 62, in the chassis 20, or if the motive power element A4 is a drive motor 36, 46 driven by a motor driver/amplifier adjacent the wheels 32, 52, 42, 62 within the chassis 20 (e.g., at A2), the distance to the drive motors 36, 46 can be short, e.g., between a drive wheel radius distance and a distance to a rear wheel (i.e., within the skid steer wheel or track envelope D), resulting in drive cabling or wiring that generates minimal EM emissions. The placement of these motor drivers and amplifiers A4 at this location D, in combination with drive motors 36, 46 placed adjacent drive wheels 32, 52, 42, 62 but within the chassis 20 (e.g., within location C of "A2-C"), contributes to the advantages of a preferred combination of morphology and placement of motive power elements of the robot 10, 1000.

Another feature of the robotic vehicle 10, 1000 is the placement of a motive power element A2 generating significant waste heat adjacent a drive wheel 36, 46 (in position "C" of "A2-C"), and also either directly next to the main chassis 20 or substantially next to the main chassis 20 (via similarly cast and/or machined intervening plate(s) flush-mounted for thermal conduction to the main chassis 20), each of the chassis 20 or intervening plates 26 made in cast or machined form mostly of the structural, heat conductive materials discussed above.

In this location, the heat generated (e.g., at least about 5% losses on about 500 W peak, but in this location more likely to be motive power elements A2 of the main drive, having at least these losses on about 2 kW peak or higher) is dissipated via the chassis 20. The motive power element A2 is serviced by, e.g., removing the main tracks 30, 40. In preferred implementations, the motive power element A2 is located within the chassis 20, so does not impede movement of mechanism or load 510 for shifting the center of gravity (e.g., Shift CG load). Little additional volume is occupied beyond the volume already necessary for the chassis 20 itself. The motive power element A2 can be sealed against the environment and immersion-proofed, as any wiring from the motive power element A2 to another motive power element (e.g., A4) within the track or drive envelope or volume D is routed within the chassis 20, without necessarily passing through any slip-rings or other moving conductive junctions. Because the chassis volume or envelope C is generally symmetrical (left and right sides of the vehicle being mirror-able), the motive power element A2 to be placed within that envelope C may be the same size and shape on each side, which permits interchangeable and/or modular assemblies to be used for the motive power element in those two locations C.

If the motive power element A2 is a drive motor 36, 46 or other motor, a second motor (motive power element) may be located above or partially concentric with the drive motor 36, 46 or other motor; and a corresponding/driving motor driver/amplifier may be located at least partially within the envelope or volume of main tracks D. With a powered skid steered or differential drive as a base platform, two drive motors 36, 46 for the two sides of the platform 20 may be as close as possible to a driven wheel 32, 42 (contacting the ground or inside of a track), with compact transmissions (e.g., a planetary gear train). Transmissions extending over longer distances (shafts, chains) are possible, but not preferable (e.g., these would tend occupy space that would be more preferably available for payload, movement of manipulators, or sensor fields of the robot).

Another feature of the robotic vehicle 10, 1000 is the placement of a motive power element A1 (or A3) generating significant waste heat as part of, and within, a load 80, 90, 510 shifted for the purpose of moving the center of gravity of the vehicle 10, 1000, for example. If this motive power element A1 is heavy (e.g., 25%-50% or more of the entire vehicle 10, 1000 in combination with the rest of a load shifted to move the CG), the center of gravity of the entire vehicle is moved more. Two possible locations for the motive power element A1 contributing to shifting the center of gravity are in position S (of "A1-S") within a main load 510 shifted by a linkage 70, or distributed between and/or within the volume F (of "A3-F") of front flippers 50, 60 rotatable with respect to main drive skid steering tracks 30, 40 or wheels 32, 42. In either case, the motive power element A1 (and/or or A3) should be directly next to and/or flush-mounted for thermal conduction to a sub-chassis (e.g., the battery box 90 together with main electronics/CG tub 90), which is made of the cast and/or machined structural, heat conductive materials discussed above.

In these locations S (or F), the heat generated (e.g., at least about 5% losses on about 500 W peak, but in these locations also likely to be include higher losses on a battery pack serving 42V, 30 A continuous power) is dissipated via the sub-chassis. A motive power element A1 in the linkage-shifted load 510 is readily serviced by opening the top deck 80; and a motive power element A3 distributed between the front flipper volumes F is readily accessible and serviced with similar advantages to the earlier discussed motive power element partially within the main drive volume D. The motive power element A1 in the linkage-shifted load 510 does not impede movement of the linkage 70 or main drive 36, 46, 30, 40, and a motive power element A3 within the flipper volume F similarly does not impede movement of linkage 70 or main drive 36, 46, 30, 40. For the front flippers 50, 60, very little volume is occupied beyond the volume already necessary for the flipper tracks 54, 64 themselves. A motive power element A1 in the linkage-shifted load 510 can be sealed against the environment and immersion-proofed, as any wiring from this motive power element A1 to another motive power element within the chassis 20 or drive envelope or volume D is routed within the sealed linkage 70. A motive power element A3 (or alternatively, other element such as reserve batteries or storage box) within the front flipper volume F can also be readily sealed. Because the front flipper volumes F are generally symmetrical (left and right sides of the vehicle being mirror-able), an element to be placed within that envelope may be the same size and shape on each side, which permits interchangeable and/or modular assemblies to be used for the element in those two locations.

If the motive power element A1 in the linkage-shifted load 510 is a battery assembly 92, power may be transferred via the linkage 70, and motor driving signals need not be, leading to lower EM emissions and an "EM quiet" configuration.

Another feature of the robotic vehicle 10, 1000 is the provision of two, for example a 500 W and 2 kW peak, motor driver/amplifiers within the same enclosure, at least partially within the volume of the main tracks D, and also either directly next to the main chassis 20 or substantially next to the main chassis, either of the chassis 20 or intervening plates 26 made mostly of the structural, heat conductive materials discussed herein.

In some implementations, the robot 10, 1000 has two main drive motors 36, 46 and three auxiliary motors (one flipper actuator 55, two linkage pivot motors 72, 74 that shifts a load 510 and/or payload in order to shift the CG of the vehicle 10, 1000). At least the flipper motor 55 is located in the forward chassis 20 adjacent the main drive 36, 40 (e.g., a location C of "A2-C"), the flippers 50, 60 being rotated concentrically about the front skid steer drive wheel axis 15. In addition, a motor 72 for shifting the load 510 (and CG) is also advantageously located in the forward chassis 20 adjacent the main drive 36, 40 (e.g., a location C of "A2-C"). If the motor 55 for rotating the flippers 50, 60 (or other mobility element) is substantially similar to the motor 72 for rotating the CG-shifting load, these may be driven by the same motor driver/amplifier. In a location at least partially within the volume D of the main tracks 30, 40 and optionally partly within the chassis 20, the heat generated (e.g., by a combination of two motor driver/amplifiers: one for the main drive motor 36, 46 having at least about 5% losses to heat on 2 kW peak or higher, as well as the smaller 500 W flipper or shifter motor) by two different motor drivers/amplifiers (two on each side of the robot) is dissipated via the chassis 20. These motive power elements A4 (four different motor driver/amplifiers) are readily accessible from the side of the robot 10, 1000, and may be serviced readily, slideable or translatable in a horizontal direction. These motive power elements A4 are located at least partly within the track/wheel volume D, do not impede movement of mechanism or load 510 for shifting the center of gravity, and little volume is occupied beyond the volume already necessary for the chassis 20 and tracks/wheels 30, 40, 32, 42. These motive power elements A4 can be sealed together against the environment and immersion-proofed, as any wiring from one of the motive power elements A4 to another motive power element adjacent the wheels 32, 42 (e.g., A2-C) is routed within the chassis 20, without necessarily passing through any slip-rings or other moving conductive junctions. Wiring to the four motors 36, 46, 55, 72 in the chassis 20 for drive, flippers, and shifting the center of gravity is routed within chassis 20. These motive power elements A4 may be the same size and shape, so that interchangeable and/or modular assemblies to be used for the motive power elements in those two locations can be used, even though one side drives one main drive and flipper, while the other side drives one main and CG shifter.

Again, for these motor driver/amplifiers in locations D of "A4-D", the distance to the drive motors 36, 46 can be short, e.g., between a drive wheel radius distance and a distance to a rear wheel (i.e., within the skid steer wheel or track envelope), resulting in drive cabling or wiring that generates minimal EM emissions—from four separate motors. The placement of these four different motor drivers 36, 46, 55, 72 and amplifiers at these locations D of "A4-D", in combination with drive, flipper, and shifter motors A2 placed adjacent drive wheels but within the chassis (e.g., at locations C of "A2-C"), contributes to the advantages of a preferred combination of morphology and placement of motive power elements of the robot 10, 1000.

As shown in FIGS. 7 and 29, this configuration of motive power elements within the chassis, track volume C, D, and shiftable load 510 may result in a fully environmentally sealed robot needing no exposed wiring, yet having many replaceable parts readily serviceable and modular. The chassis 20 is cast then machined, and includes cavities C into which are mounted four motors 36, 46, 55, 72 and transmissions. These cavities C are sealed by a plate-transmission arrangement that leaves exposed only a sealed drive main spline (seen in FIG. 29). Internally, the cavities C are connected to mounts for the linkage 70 and to further side cavities D. Wiring is internally routed from the motors 36, 46, 55, 72 in C to the motor drivers and amplifiers within cavities D. These cavities D are environmentally sealed with a plate 26 and cover 27, serviceable through the main tracks 30, 40. Wiring is also internally routed from the chassis 20 general and cavities C through the mounts for the linkage 70—one left-right lateral side of the linkage 70 is used for a swing actuator 72 at the bottom 70A and tilt actuator 74 at the top 70B, and the remaining left-right-side routes cables. The linkage 70 is sealed at the bottom 70A and the top 70B. The tilt actuator 74 at the top 70B is another motive power element that generates heat. However, the battery assembly 92 in the shiftable CG load 510, 80 generates more heat that is sunk into the machined casting of the battery box 92, deck 80, and electronics tub 90.

FIG. 36 provides a schematic view of the controller, drive and actuator system of a preferred control system for robotic vehicle 10. The robotic vehicle 10 includes a main computer 5320 which runs control logic 5400 to control the robotic vehicle 10. The main computer 5320 communicates with the drive modules 5500 and the actuator modules 5600 over a motor control controller area network (CAN) bus 5325.

FIGS. 36 and 37A-D depict a track drive module 5500. The track drive module 5500 includes a module housing 5502, a motor 5530 supported by the module housing 5502, and a motor controller 5510 supported by the module housing 5502 and in communication with the motor 5530. In one instance, the motor 5530 is a low inductance-high power 2000 W motor providing between about 2000-10500 maximum revolutions per minute. This is only an example and the motor design may vary based on required capabilities and other design constraints. In one implementation, the track drive module 5500 further includes a back-drivable gearbox 540 (e.g. a planetary gearbox) supported by the module housing 5502 and coupled to the motor 5530. In one example, the gearbox 5540 provides a 30:1 gear reduction. In the depicted implementation, the drive module 5500 is also sealed within a respective receptacle, 22, 24, of the chassis 20 from an outside environment and is passively cooled.

Figure 38A:
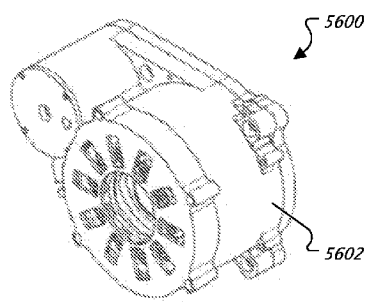
FIG. 38A is a perspective view of an actuator module.
Figure 38B:
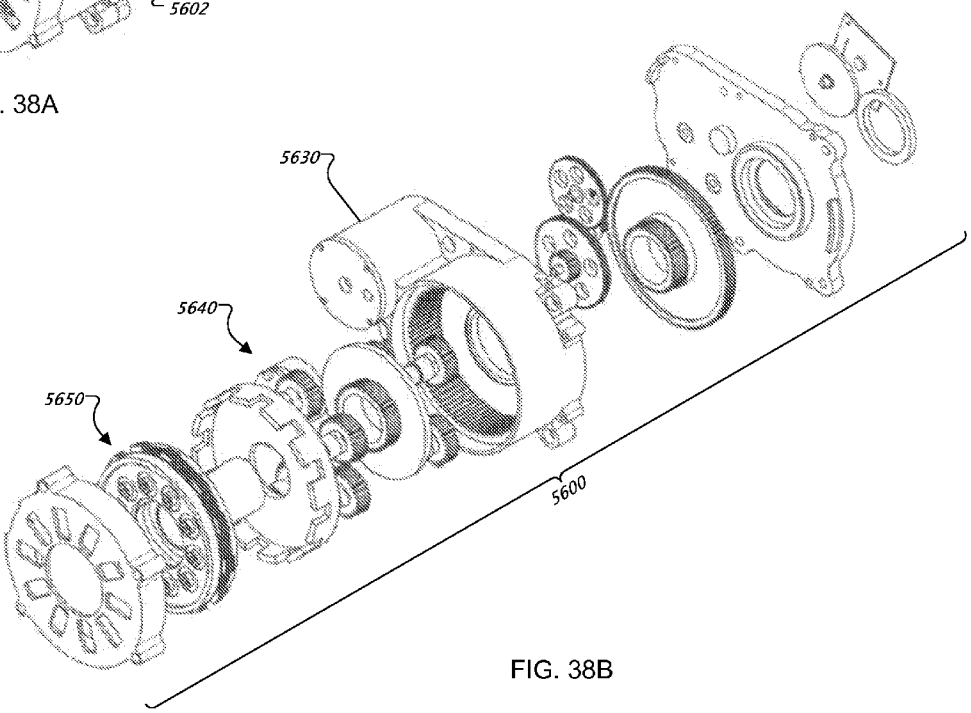
FIG. 38B is an exploded view of an actuator module.

FIGS. 36 and 38A-B depict an actuator module 5600. The actuator module 5600 includes a module housing 5602, a motor 5630 supported by the module housing 5602, and a motor controller 5610 supported by the module housing 5602 and in communication with the motor 5630. In one instance, the motor 5630 is a low inductance-high power 500 W motor providing between about 17K-20K maximum revolutions per minute. In one implementation, the actuator module 5600 further includes a back-drivable planetary gearbox 5640 supported by the module housing 5602 and coupled to the motor 5530. In one example, the gearbox 5540 provides a 1700:1 gear reduction. The actuator module 5600 also includes a slip clutch 5650 supported by the module housing 5602 and coupled to the planetary gearbox 5640. The slip clutch 5650 absorbs impacts to the actuator module 5600. For example, when the robotic vehicle 10 maneuvers down off of a ledge onto a ground surface the flippers 50 and 60 incur an initial landing impact that creates a large moment about the front wheel axis 15. The slip clutch 5650 allows the flippers 50 and 60 to rotate while overcoming a frictional resistance of the slip clutch 5650, thereby absorbing the impact and avoiding damage to the gearbox 5640. Likewise, a sudden impact to the payload deck 80 is absorbed by the slip clutch 5650 in the actuator modules 5600 located at the first and second pivots, 71 and 73 respectively. For example, a disruptor module attached to the payload deck 80 will experience recoil when detonating bombs. The slip clutch 5650 in the actuator modules 600 located at the first and second pivots, 71 and 73 respectively, will absorb the sudden recoil, thereby avoiding damage to the gearbox 5640. An absolute position encoder 5660 disposed on an actuator shaft 5606 provides an absolute position of the actuator shaft 5606 to the actuator controller 5610.

Each module, 5500 and 5600, includes a power connector, 5504 and 5604 respectively, disposed on an outer surface of the module housing, 5502 and 5602 respectively. The power connector, 5504 and 5604, is configured to mate with a corresponding power bus connector 5326 to establish an electric power connection to the module, 5500 and 5600 respectively.

The drive module 5500 establishes an electric power connection with the bus power connector 5326 within its respective receptacle 22, 24 as the module 5500 is placed within the receptacle 22, 24.

In another aspect, a robotic vehicle 10 includes a chassis 20 having front and rear ends, an electric power source 90 (e.g. a bank of nine standard military BB-2590 replaceable and rechargeable lithium-ion batteries or a fuel cell) supported by the chassis 20, and multiple drive assemblies, 30 and 40, supporting the chassis 20. Each drive assembly, 30 and 40, includes a track, 34 and 44, trained about a corresponding drive wheel, 32 and 42, and a drive control module, 36 and 46. Each drive control module, 36 and 46 (also referred to as 5500), includes a drive control housing 5502, a drive motor 5530 carried by the drive control housing 5502 and operable to drive the track, 34 and 44 respectively, and a drive motor controller 5510 in communication with the drive motor 5530. The motor controller 5510 includes a signal processor 5515 (preferably a digital signal processor (DSP)) and an amplifier commutator 5520 in communication with the drive motor 5530 and the signal processor 5515 and capable of delivering both amplified and reduced power to the drive motor 5530 from the power source 90. The ability to provide both amplified and reduced power to a low inductance-high power drive motor 5530 provides a dynamic drive range with a gear reduction box 5540, rather than a complex transmission.

In one implementation, the track drive module 5500 includes a DC drive motor 5530, where regenerative braking can be obtained on applications requiring quick stops. DC motor-generated energy is fed back into the electric power source 90 of the dc motor, replenishing available power. In one example, the signal processor 5515 uses a resistive load to prevent regenerate energy from passing back to the pour source 90.

In another implementation, the actuator module 5600 includes a DC drive motor 5630, where regenerative braking can be obtained on applications requiring quick stops or when experiencing recoils such as when the slip clutch 5650 absorbs an impact or recoil. DC motor-generated energy is fed back into the electric power source 90 of the dc motor, replenishing available power. In one example, the signal processor 5615 uses a resistive load to prevent regenerate energy from passing back to the pour source 90. Furthermore, a magnetic brake within the motor 5630 inhibits actuation upon power loss.

Figure 39A:
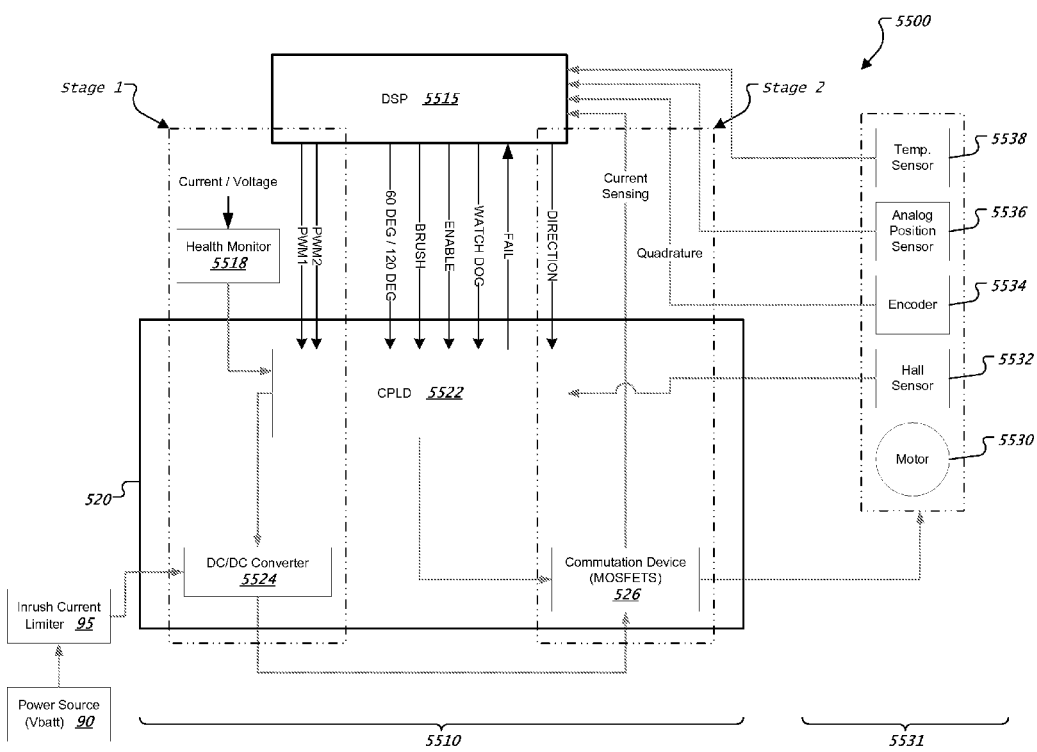
FIG. 39A is a schematic view of a drive module.

FIG. 39A is a block diagram of the drive control module 5500. The amplifier commutator 5520 includes a commutator 5526 in communication with the drive motor 5530, a DC/DC converter 5524 capable of delivering both amplified (boost) and reduced (buck) power to the commutator 5526, and a programmable logic circuit (e.g. a complex programmable logic device (CPLD)) 5522 in communication with the signal processor 5515, DC/DC converter 5524, and commutator 5526. The amplifier commutator 5520 allows for control of high torque, brushless or brushed motors with fairly accurate position control. In one implementation, the amplifier commutator 5520 includes two stages. The first stage provides large motor torque and includes a DC/DC converter 5524 for providing voltage to the second stage. The second stage includes a three-phase bridge commutator 5326 that allows for control of different kinds of motors. The power supply to the commutator 5326 is controlled by a combination of voltage control from the DC/DC converter 5524 via pulse-width modulation (PWM) control to the programmable logic circuit 5522 and current control via the FETS/commutators of the commutator 5526.

In some examples, the motor controller 5510 communicates with a motor system 5531 which includes the motor 5530, multiple magnetic field sensors 5532 (e.g. Hall effect sensors) mounted radially about the motor 5530 to detect magnetic pulses, a velocity sensor 5534 (e.g. an encoder), and a rotary position sensor 536 (e.g. an analog position sensor). The magnetic field sensors sensor 5532 measures a motor rotor position or other position information associated with the motor 5530 and provides a feedback signal to the programmable logic circuit 5522. The signal processor 5515 also receives feedback with respect to the motor 5530 from the velocity sensor 5534 and the rotary position sensor 5536. The position sensor 5536 obtains position data associated with the gearbox 5540 or the shaft 5506. Based on these feedback signals, the signal processor 5515 can change the duty cycle of the PWM signals. In one example, the motor system 5531 also includes a temperature sensor 5538 that measures a motor temperature and provides a feedback signal to the signal processor 5515.

Figure 39B:
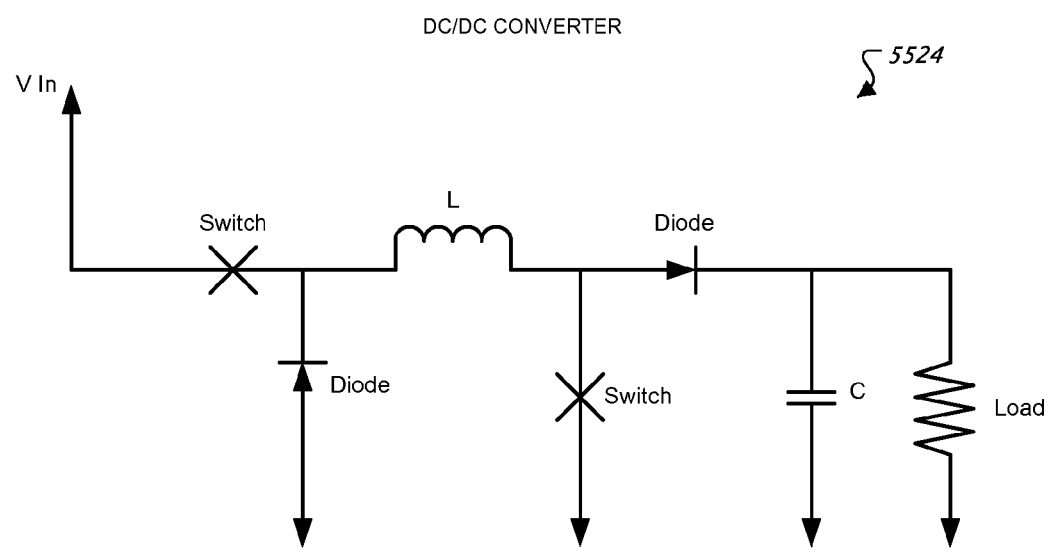
FIG. 39B is a schematic view of a DC/DC converter.

FIG. 39B depicts one example of the DC/DC converter 5524. The circuitry for providing buck and boost includes two switches, two diodes, a transistor, and a current storage element including an inductor and a capacitor. The order of these components dictates whether the DC/DC converter 5524 provides buck or boost. A bank of FETs switch the direction of current flow in the circuit and therefore its operation. In one example, the DC/DC converter 5524 receives about 42 V from the power source 90 and is capable of delivering between about 0 V and about 150 V. The power source 90 may include three 14 V batteries in series and three 14 V batteries in parallel, providing 42 V to the robotic vehicle 10. Furthermore, a current from the power source 90 is controlled by an inrush current limiter 95.

The signal processor 5515 controls the amplifier commutator 5520. When the robot controller 5320 (e.g. a single board computer) sends a drive command to a drive module 5500, the signal processor 5515 determines whether power amplification (boost) or reduction (buck) is required to perform the command. The signal processor 5515 communicates with the programmable logic circuit 5522 to operate the DC/DC converter 5524 accordingly to provide the appropriate power to the commutator 5526, which drives the motor 5530.

The motor controller 5510 can supply drive signals to a motor 5530, such as a brush motor, 3-phase induction motor in scalar control mode or vector control mode (using an encoder), or brushless DC motor in sinusoidal or PWM (using an encoder), and a three-phase AC motor. Hall effect sensors 5532, quadrature encoding 5534, and a position sensor 5536 are available for speed/position feedback (in addition to feedback from the commutators, etc.).

Figure 39C:
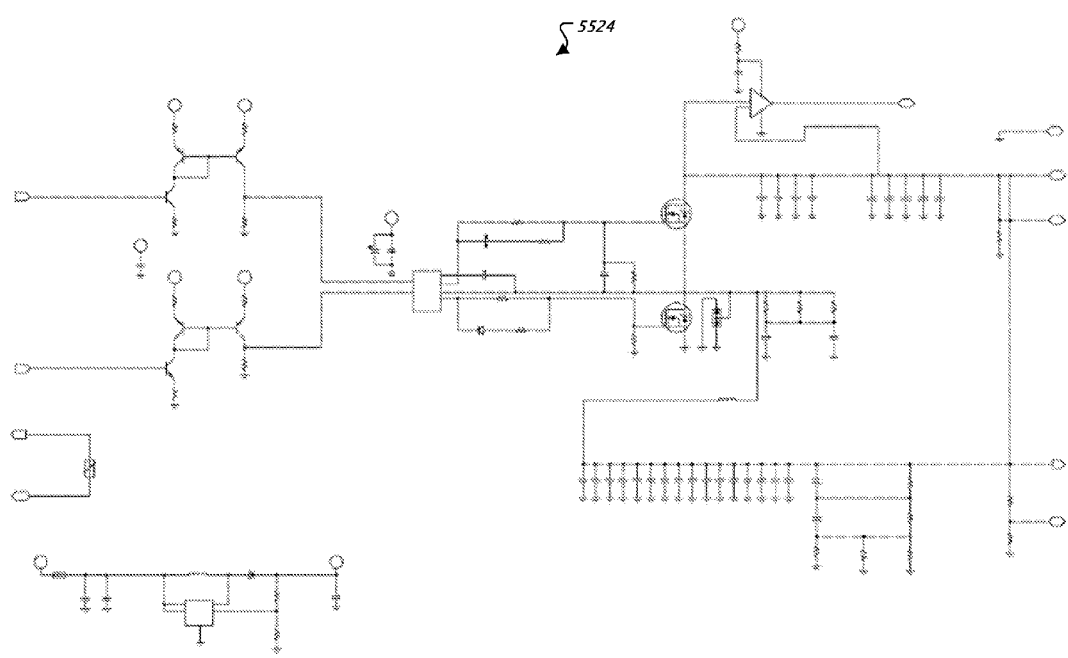
FIG. 39C is a schematic view of a DC/DC converter.

Both the signal processor 5515 and the programmable logic circuit 5522 can conceivably be considered part of each stage, because of their (control) contribution to e.g., DC/DC conversion in stage 1 (setting the voltage) and to running the FETS of the commutator 5326 in stage 2. The DC/DC converter 5524 increases/decreases and regulates an input power and can be connected to an inductor. The DC/DC converter 5524 receives a pulse-width modulation (PWM) signal from the signal processor 5515 via the programmable logic circuit 5522 having a duty cycle proportional to the required power. For example, the PWM signal can control one or more switches in the DC/DC converter 5524 which control the voltage or current out of the DC/DC converter 5524. The signal processor 5515 sends two PWM signals to the programmable logic circuit 5522 with a duty cycle proportional to current command. PWM1 controls a high site MOSFET and PWM2 controls a low site MOSFET. To avoid through shot current, PWM1 and PWM2 signals have dead time between falling and rising edges. The dead time can be set by signal processor 5515, and it can be, for example, 125 nSec. In one implementation, the PWM frequency is 30 kHz. FIGS. 39B-C each provide schematic diagrams of example DC/DC converters 5524. Standard electrical symbols known in the art of electronics should be used in interpreting the schematics.

Figure 39D:
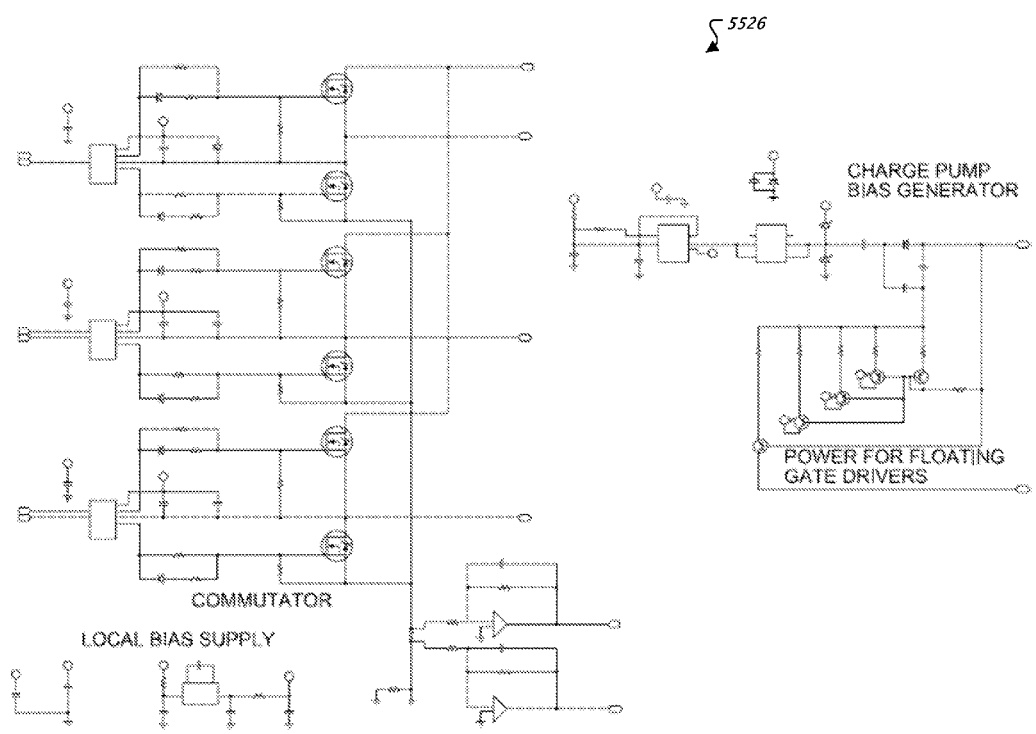
FIG. 39D is a schematic view of a commutator.

The programmable logic circuit 5522, in one example, provides commutation signals for six power MOSFETs of the commutator 5326 assembled as a three phase bridge and acts as a protection device for a variety of signals. FIG. 39D provides a schematic diagram of one example of a commutator 5326. The commutation signals provided by the programmable logic circuit 5522 result from a logic conversion of inputs from three Hall effect sensors 5532 and a direction input from the signal processor 5515. Six output signals from the programmable logic circuit 5522 are received by and control the power MOSFETs of the commutator 5326. Commutation signals can be generated for 60° or 120° spaced Hall sensors 5532. Protection logic verifies that Gray Code is not violated. In cases where a violation of Gray Code or Hall conditions occur, a commutation fault signal is established. The commutation sequence changes depending on the direction command.

The signal processor 5515 may send a signal to the programmable logic circuit 5522 to operate in a brushless mode or a brush mode. Accordingly, commutation signals can be generated for brushed and brushless DC motors. In brushless mode, the programmable logic circuit 5522 receives a feedback signal from the Hall effect sensors 5532 and sends control signals based on the Hall sensor feedback signal to an H-bridge included with the commutator 5326 to control the motor 5530. The signal processor 5515 uses commutation signals from tables associated with brushless operation and sends a signal to the commutator 5326 accordingly. In brush mode, the signal processor 5515 receives feedback from the encoder 5534 and sends control signals to the commutator 5326 through the programmable logic circuit 5522 based at least in part on an encoder signal. The programmable logic circuit 5522 uses commutation signals from tables associated with brush operation and sends a signal to the commutator 5326 accordingly. The commutator 5326 controls the motor 5530 using the H-bridge. Furthermore, in the case of a brushed motor, phase A or B is used to commutate the motor depending on the direction command.

After receiving the operation mode, the programmable logic circuit 5522 provides a control signal to the commutator 5326. The commutator 5326 drives the motor 5530 with DC power from the DC/DC converter 5524 and changes a direction of motor rotation based on direction control signals from the signal processor 5515 via the programmable logic circuit 5522. The signal processor 5515 can receive a current sensing feedback signal from the commutator 5326 and use the current sensing feedback signal to control a duty cycle of the PWM signals to the DC/DC converter 5524.

The signal processor 5515 includes three cascading control loops for: 1) motor current (≈a torque) and commutation; 2) motor voltage (≈a speed); and 3) motor rotor position. The signal processor 5515 monitors feedback from the motor current at about 30 kHz (33 μSec), the motor voltage at about 250 Hz (4 milliseconds), and the motor rotor position at about 50 Hz (10 milliseconds). For each current control loop iteration, the signal processor 5515 reads the current sensing feedback from the commutator 5326, reads the Hall effect sensors 5532, computes a PWM output, writes the PWM output to a shared structure accessible by the other control loops, and updates a cycle counter. The signal processor 5515 monitors the Hall effect sensors 5532 to insure that they do not all have the same value. For each voltage control loop iteration, triggered by a software interrupt in the current control loop, the signal processor 5515 reads a velocity feedback from the encoder 5534, reads the voltage feedback from the DC/DC converter 1524, and computes a commanded current based on a current limit, maximum current from a thermal protection model, and a current rate of change limit. The signal processor 5515 writes the commanded current to a shared structure accessible by the other control loops. The signal processor 5515 also checks for a stall condition and for regenerative braking. If regenerative braking is detected, the signal processor 5515 checks the available power level of the power source 90 and charges the power source 90 until a charged level is attained. For each position control loop iteration, the signal processor 5515 reads the position feedback from the position sensor 5536, computes a commanded velocity based on current and velocity limits, and writes the commanded velocity to a shared structure accessible by the other control loops.

Figure 39E:
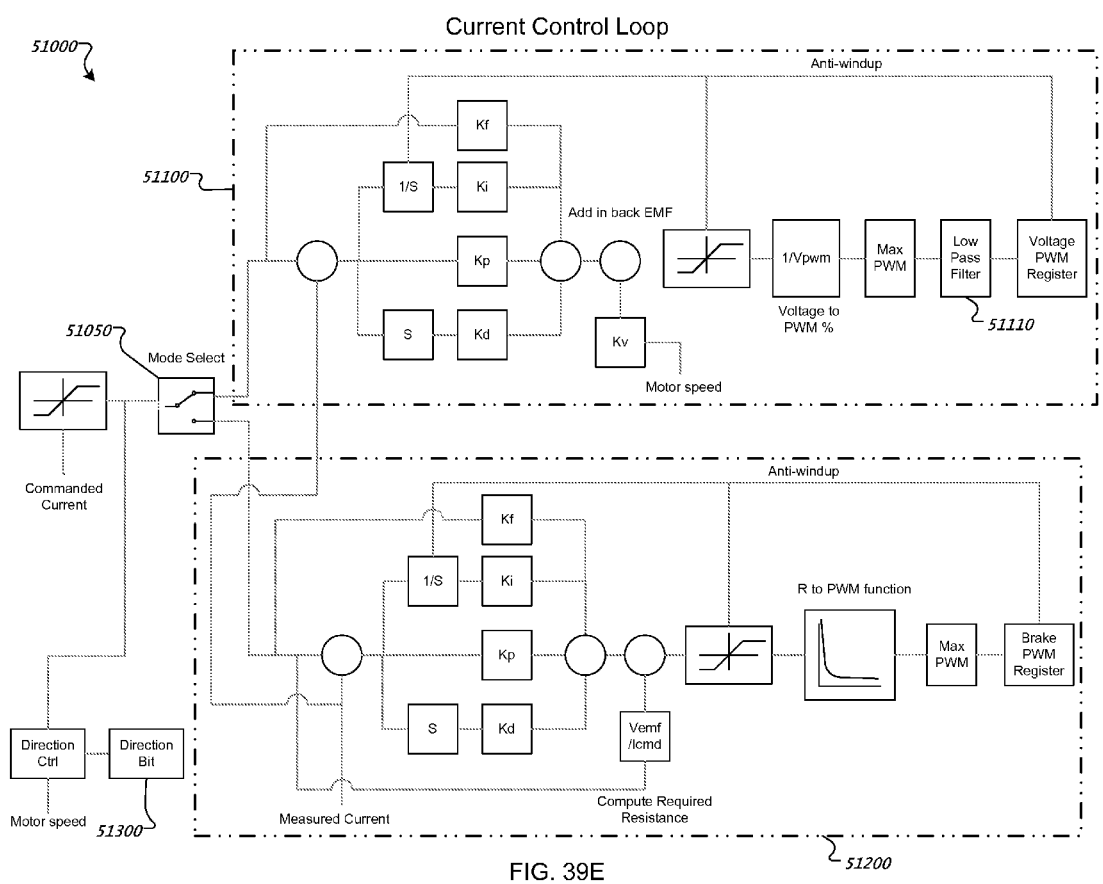
FIG. 39E is a schematic view of control logic for a digital signal processor.
Figure 39F:
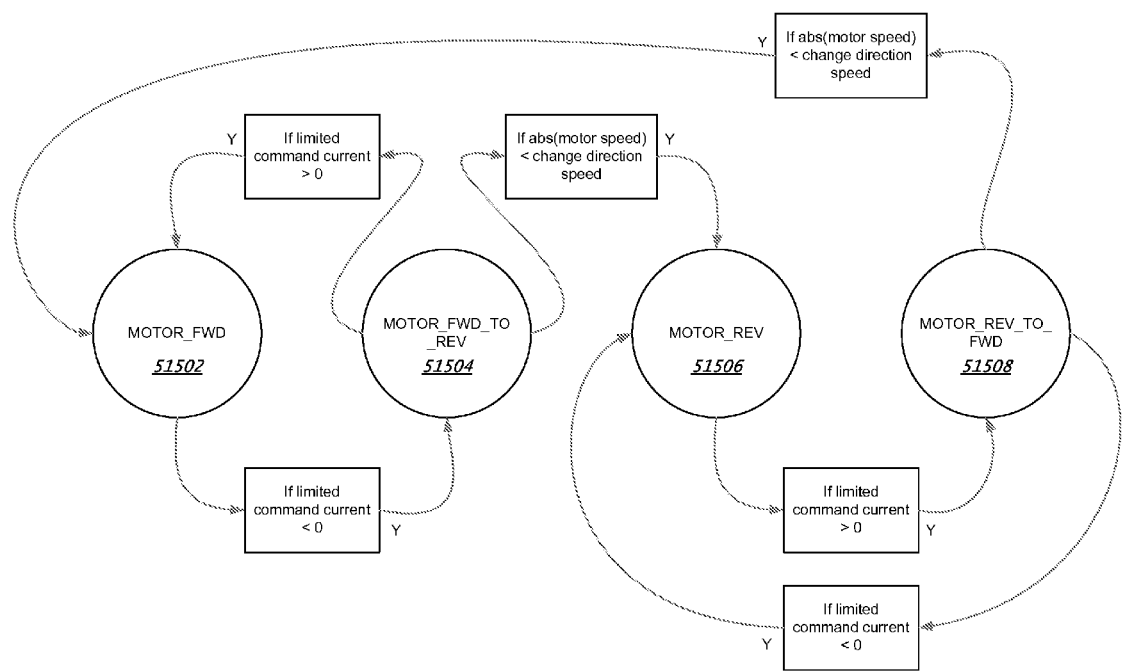
FIG. 39F is a motor current direction state diagram.
Figure 39G:
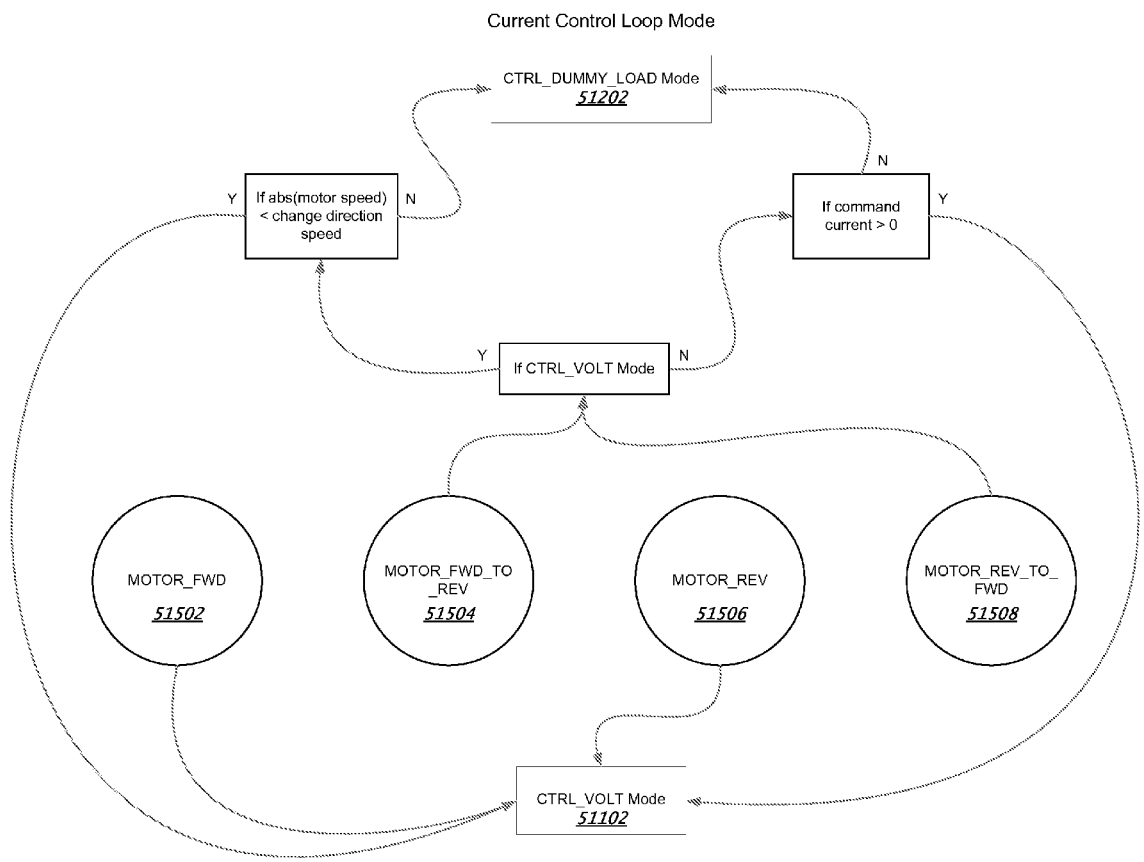
FIG. 39G is a current control loop mode diagram.

Referring to FIGS. 39E-G, for the drive module 5500 and the actuator module 5600, the motor control logic on the DSP 5515, 5615 provides a buck-PWM, which is PWM control from 0 volts to a supply voltage; a brake-PWM, which is PWM control of a dummy load resister across the motor 5530, 5630; a direction bit, which sets the commutation direction for the CPLD 5522; and a commutation inhibit, which inhibits commutation when the motor 5530, 5630 is acting like a generator. For the drive module 5500, the motor control logic on the DSP 5515 also provides a boost-PWM, which is PWM control of a voltage booster for the motor 5530 to command more than the supply voltage to the motor 5530.

In a positioning system, a motor current loop (controlling acceleration) forms a part of a velocity loop (controlling motor speed), which in turn is part of an outer loop of position, which has desired position as a reference. An error in position calls for more or less speed, and an error in speed calls for more or less acceleration (current). Each loop must be stabilized, or preferably optimized, starting with the innermost loop.

The control structure includes a torque (or current) PID (Proportional-Integral-Derivative) control loop 51000 and a velocity PID control loop 52000 on top of the current control loop 51000. Each element of the PID control loop 51000, 52000 refers to a particular action taken on an error. An output control variable (CV) is based on the error (e) between a user-defined set point (SP) and a measured process variable (PV). The proportional element is the error multiplied by a gain, Kp. This is an adjustable amplifier and is responsible for process stability (e.g. too low and the PV can drift away; too high and the PV can oscillate). The integral element is an integral of error multiplied by a gain, Ki, which is responsible for driving the error to zero. However, setting Ki too high invites oscillation or instability, integrator windup, or actuator saturation. The derivative element is a rate of change of error multiplied by a gain, Kd, which is responsible for system response (e.g. too high and the PV will oscillate; too low and the PV will respond sluggishly). Tuning of a PID involves the adjustment of Kp, Ki, and Kd to achieve some user-defined "optimal" character of system response. Another adjustment for achieving an optimum performance may include maximizing low frequency gain, Kf, and minimizing high frequency gain, Kf.

The torque (current) control loop 51000 includes a voltage loop 51100 and a dummy load or brake loop 51200. The torque control loop 51000 also determines a direction bit

51300 of the commutator 5526. The input command current is rate and value limited. A sign (+/−) of the limited command current is used to determine a desired motor direction.

Referring to FIG. 39F, a motor current direction state diagram, there are four motor current direction states, which include a MOTOR_FWD state 51502, a MOTOR_FWD_TO_REV state 51504, a MOTOR_REV state 51506, and a MOTOR_REV_TO_FWD state 51508. The MOTOR_FWD state 51502 exists when the motor 5530 is running in a forward direction. The MOTOR_REV state 51506 exists when the motor 5530 is running in a reverse direction. The MOTOR_FWD_TO_REV state 51504 is a transitional state when the motor 5530 is changing from the forward direction to the reverse direction. The MOTOR_REV_TO_FWD state 51508 is also a transitional state when the motor 5530 is changing from the reverse direction to the forward direction. If the motor current direction state is MOTOR_FWD 51502, then if the limited command current is less than zero, move to the MOTOR_FWD_TO_REV state 51504. If the current direction state is MOTOR_REV, then if the limited command current is greater than zero, move to the MOTOR_REV_TO_FWD state 51508. If the current direction state is MOTOR_FWD_TO_REV 51504, then if an absolute value of the motor speed is less than a change direction speed, move to the MOTOR_REV state 51506. If the limited command current is greater than zero, move to the MOTOR_FWD state 51502. If the current direction state is MOTOR_REV_TO_FWD 51508, then if an absolute value of the motor speed is less then the change direction speed, move to the MOTOR_FWD state 51502. If the limited command current is less than zero, move back to the MOTOR_REV state 51506. The change direction speed is the fastest speed the motor can operate at while changing the commutation direction by changing the direction bit 51300. Changing the direction bit 51300 while operating the motor 5530 at a faster speed could destroy the FETs 5526 controlling the motor 5530. The state machine described above is set up to change the direction bit 51300 in a controlled manner, thereby avoiding damage to the system. The direction bit 51300 is set once a current direction state is determined and the direction bit 51300 is changed only while in the MOTOR_FWD 51502 or MOTOR_REV 51506 current direction states. The direction bit 51300 remains uncharged while in transition current direction states (MOTOR_FWD_TO_REV 51504 or MOTOR_REV_TO_FWD 51508).

Referring to FIGS. 39E and 39G, the mode select block 51050 of motor control logic on the DSP 5515 determines which PID loop (the voltage control loop 51100 or the dummy load control loop 51200) to run. The motor control logic does not switch between using the voltage control loop 51100 to control the current and the dummy load control loop 51200 to control the current unless the command current changes sign (+/−). If the current direction state is MOTOR_FWD 51502 or MOTOR_REV 51506, the motor control logic runs the voltage loop 51100 in a CTRL_VOLT mode 51102 and uses the voltage PWM to control the motor current. If the current direction state is MOTOR_FWD_TO_REV 51504 or MOTOR_REV_TO_FWD 51508 and the motor control logic is in a CTRL_VOLT mode 51102 (using the voltage to control the current), then if an absolute value of the motor speed is less than the change direction speed, continue in the CTRL_VOLT mode and use the voltage PWM; otherwise, set the motor control logic mode to CTRL_DUMMY_LOAD 1202 and use the PWM from the dummy load or brake control loop 51200 to slow the motor down. If the current direction state is MOTOR_FWD_TO_REV 51504 or MOTOR_REV_TO_FWD 51508 and the motor control logic is in the CTRL_DUMMY_LOAD mode 51102, continue in the CTRL_DUMMY_LOAD mode 51202 and use the dummy load PWM. If the current is greater than zero, set the motor control logic mode to CTRL_VOLT 51102; else, set the mode to CTRL_DUMMY_LOAD 51202.

Both the voltage PID loop 51100 and the dummy load PID loop 51200 have the same Integrator decay, Anti-windup, Integrator limiting and command rate limiting measures as the velocity loop 52000.

Referring again to FIG. 39E, in the voltage control loop 51100, a computed back EMF needed to keep the motor 5530 at the current speed is added to the PID loop command. This floats the PID loop 51100, meaning the PID does not need to create as big a command and does not need to keep as large a value in the integrator as it would otherwise. While in buck mode, the control logic uses the current supply voltage as the divisor when converting the command voltage to % PWM. While in buck-boost mode, the control logic uses a boost max voltage as the divisor when converting the command voltage to % PWM. The PMW command is sent through a low pass filter 51110, which in buck mode, dithers the PWM command to provide smooth control at low speeds. Some of the bottom and top PWM is lost due to the rising and falling edge delay added to the PWM generator. A PWM command of zero to min-PWM, is zero in effect. Running the loop 51100 relatively fast allows low pass filtering the PWM command without issue. The low pass filter 51110 makes the PWM command turn on and off proportionally to the lower PWM command, providing voltage control. In effect, the control logic pulse width modulates the PWM command. In Buck-Boost mode, a dead band exists at an upper end of the buck PWM and at a lower end of the boost PWM. The low pass filter 51110 of the PWM command dithers the PWM in this range allowing control of the current even in the dead band.

In the brake or dummy load loop 51200, the control logic computes the estimated resistance needed for the current command (R=Vemf/Icmd) and adds it to the output of the PID loop 51200. Like adding the back EMF in the voltage loop, this helps float the PID loop 51200 so that it does not need as large of gains and integrator wind up. Since the conversion from commanded resistance to PWM is non-linear, the control logic converts a requested resistance to PWM after the PID and estimated resistance are added together to keep the non-linearity out of the PID loop 51200. Unlike the voltage loop 51100, a low pass filter is not applied to the PWM command. Since shoot through is not a concern, the dead band generator is not running, and there is smooth control from zero to max-PWM.

The current loop 51000 toggles a software watchdog timer at 25 KHz that is sent to an external watchdog timer, which will reset the DSP 5515 if the software stops running. A motor amplifier watchdog to the CPLD 5522 is toggled at 25 KHz in the current loop 51000 as long as no hardware fault is detected, and is used for brown out protection. If the supply voltage falls below a brownout voltage, the motor amplifier 5520 is disabled because the DSP 5515 stops toggling a GPIO bit.

Figure 39H:
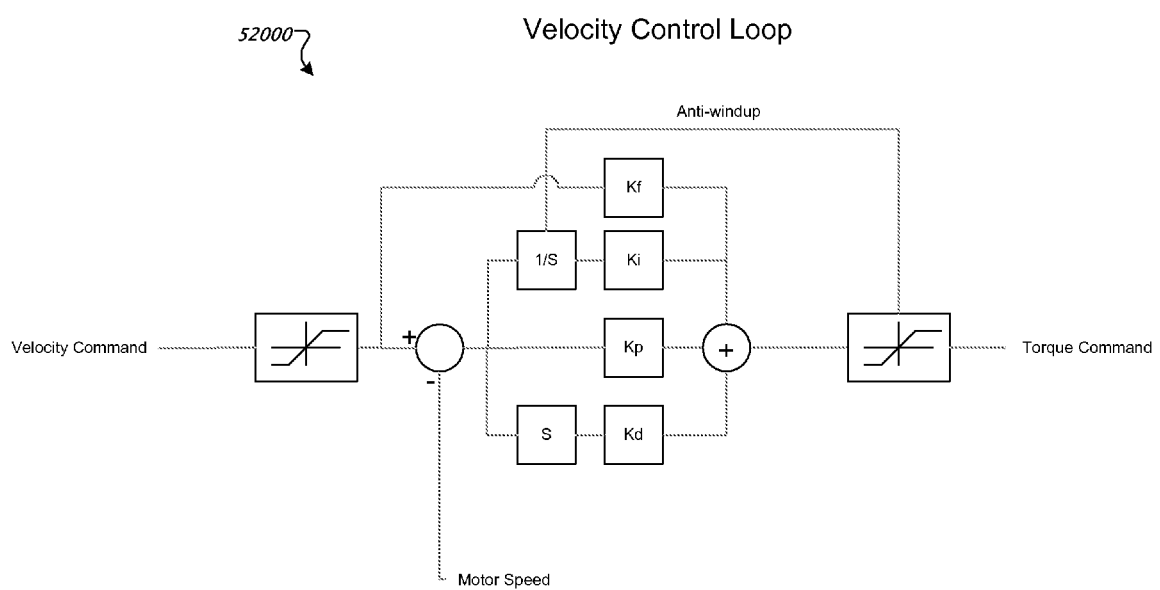
FIG. 39H is a schematic view of control logic for a digital signal processor.

Referring to FIG. 39H, the velocity control loop 52000 is a PID loop that takes a commanded speed and measured speed as inputs and provides a commanded torque as an output. The velocity control loop 52000 is enhanced by rate limiting the input command and adding an integrator anti-windup, an integrator decay and an integrator limiting measure. The rate of change of the input command to the loop 52000 is limited such that a step input is changed to a ramped input, allowing for more gentle control. A maximum speed allowed is also limited. The integrator anti-windup measure stops integration of an error when the control is saturated. Integration is stopped when an issued command is larger than a maximum command allowed by the torque loop 51000 or when the torque loop 51000 reports that a PWM command has been limited. The integrator decay measure (not shown) allows the integrator to gracefully decay to zero with a zero velocity command. The integrator decay measure is configurable from a CAN Object Dictionary (OD). If the input command is zero for more than a set number of control cycles, the integrator decay is set to a value less then one. If the commanded input is non-zero, the integrator decay measure is set to 1.0. This allows stiff control while moving, but relaxes the integrator while not commanding any speed. In one example, the integrator decay is the value of the current integrator value multiplied by each control loop iteration. If the integrator decay is 1.0, the integrator decay stays the same. If the integrator decay is 0.99, the value of the integrator slowly fades, unless it is integrating a non-zero error. The integrator limiting measure (not shown) limits minimum and maximum values sent to the integrator.

Exclusive OR logic in the programmable logic circuit 5522 protects output signals from having high level conditions at the same time for the high and low site MOSFETs. The programmable logic circuit 5522 may, for example, take configuration data as follows: Motor type: brushed or brushless; Motor: enable or disable; Hall sensor: 60° or 120°; Fault clear; DC/DC—PWR Over current: enable or disable; and Direction: clockwise or counter-clockwise.

In some implementations, a health monitor 5518 receives data associated with the motor 5530 and/or motor controller 5510 components. If these components are not functioning properly, the health monitor 5518 sends a signal to the programmable logic circuit 5522 to cease sending the PWM signal to the DC/DC converter 5524 and shuts off power to the motor 5530.

Figure 40A:
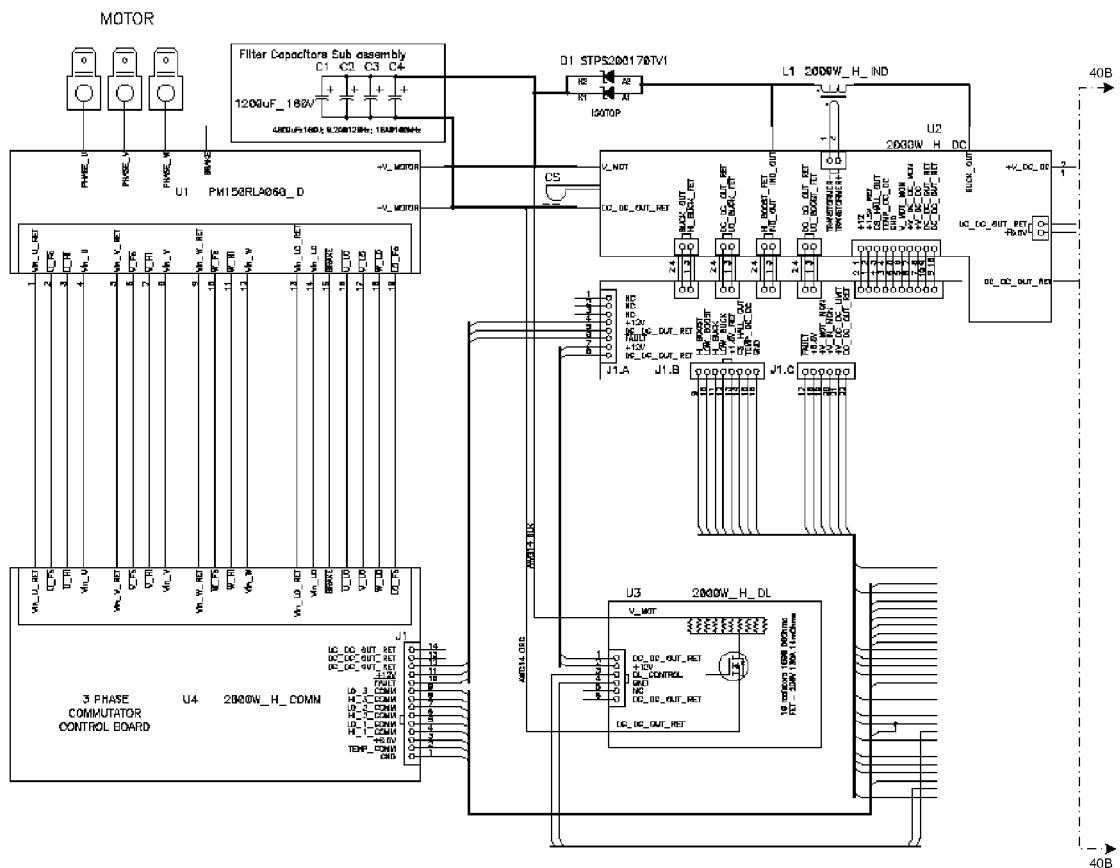
FIGS. 40A and 40B together is a schematic view of a drive module.
Figure 40B:
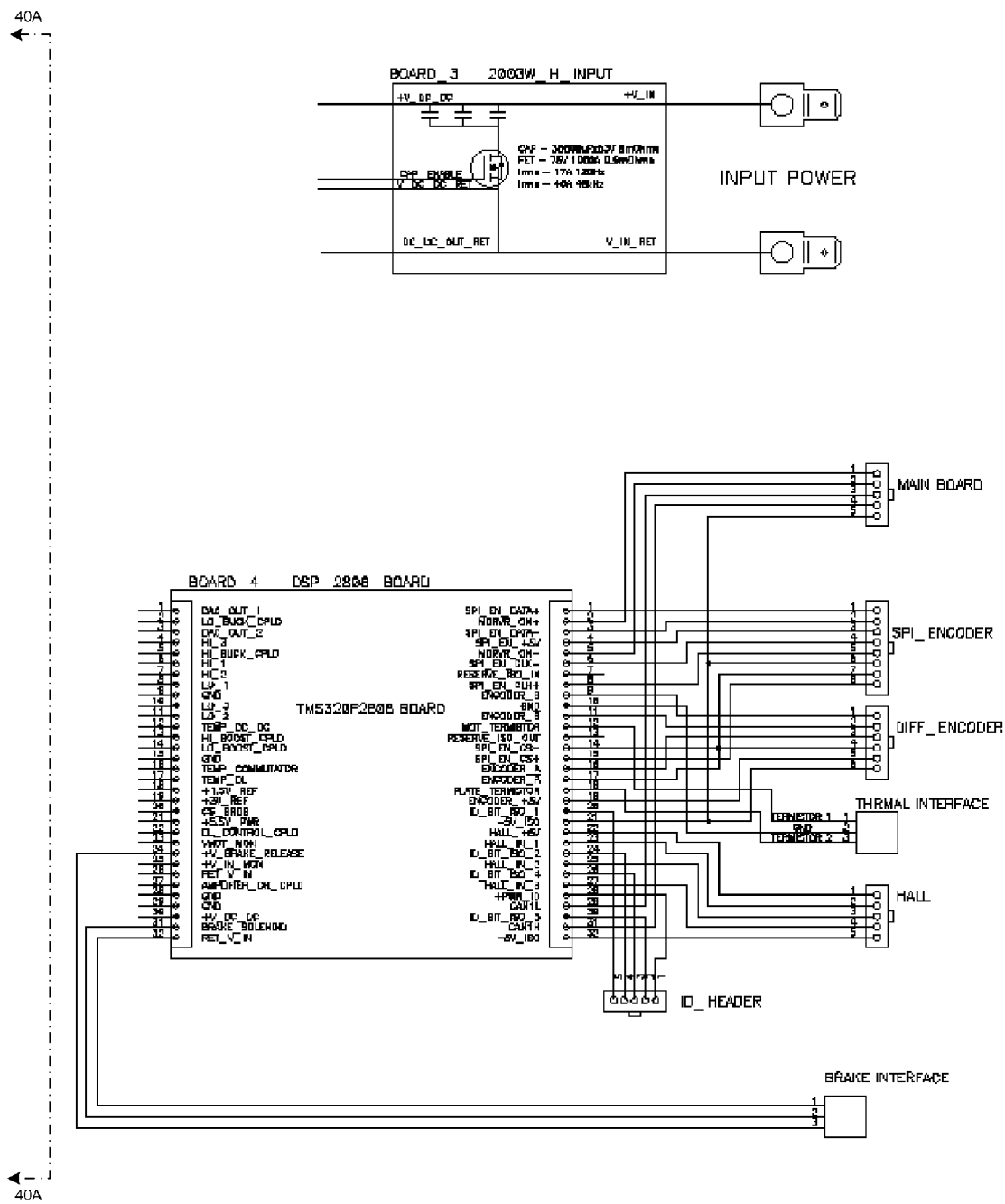
Figure 41:
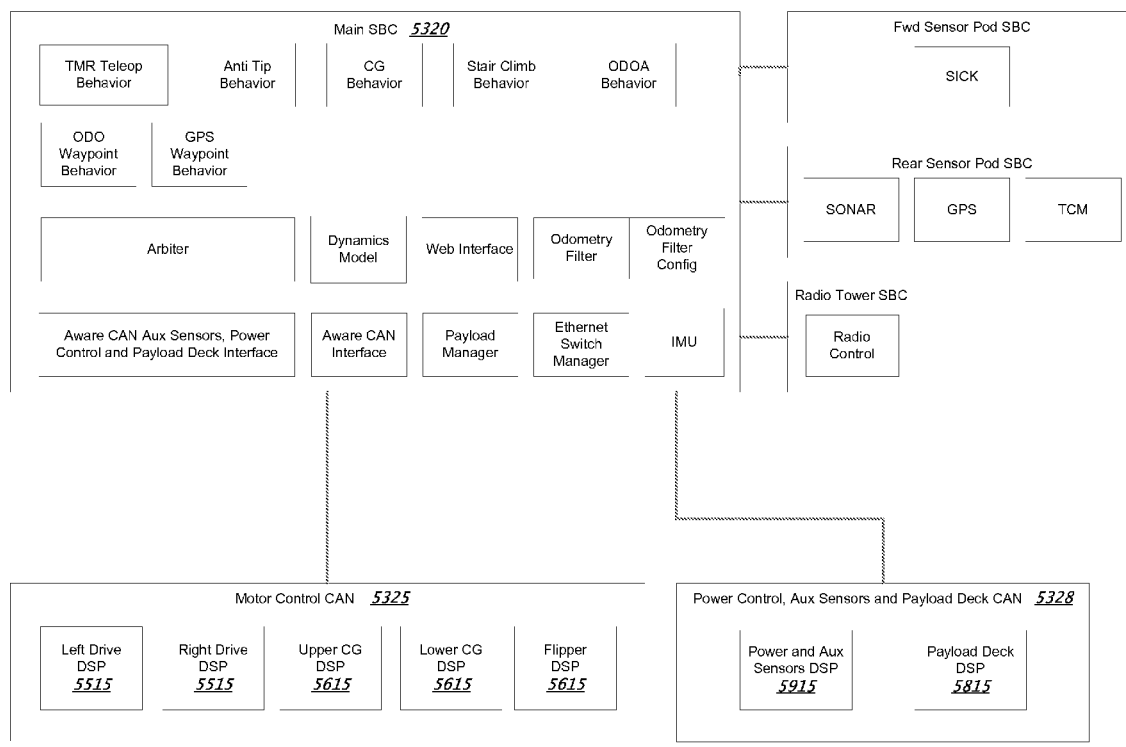
FIG. 41 is a schematic view of control logic.

FIGS. 40A-B together provide a schematic diagram of one implementation of a drive control module 5500. In some examples, the signal processor 515 and/or programmable logic circuit 5522 may be accessed by the robot controller 5320 to perform other types of processing besides motor control and amplification. For example, the signal processor 5515, programmable logic circuit 5522, and/or and another processor device, such as a field programmable gate array (FPGA) may be used by the robot controller 5320 to perform specialized logic processing associated with relatively large vector arrays, floating point computations, or other requirements, as needed to control the robotic vehicle 10.

In one example, the drive modules 5500 have a maximum operating power of about 2000 W and the actuator modules 5600 have a maximum operating power of about 500 W. In each module, 5500 and 5600, the signal processor, 5515 and 5615, and the amplifier commutator, 5520 and 5620, are mounted on a single plate, which is located in close proximity to the motor, 5530 and 5630, to minimize noise, reduce cabling, and provide a compact module, aiding modularity and interchangeability.

In another aspect, a method of controlling a robotic vehicle 10 includes providing a robotic vehicle 10 that includes a chassis 20 having front and rear ends, an electric power source 90 supported by the chassis 20, and a drive assembly, 30 and 40, supporting the chassis 20, and driven by a drive control module 500 as described above. The method also includes providing a robot controller 5320 with a power management control logic 5411 that recognizes a power source type and monitors an available power level. The robot controller 5320 communicates over a controller area network (CAN) bus 5325 to the signal processors 5515 of each drive control module 500 to deliver drive commands based on the power source type and the available power level. If the power management control logic 5410 detects a low power level or high power source temperature, the robot controller 5320 will avoid sending power intensive commands to the drive control modules 5500 and the actuator modules 5600.

Referring to FIG. 36, the robot controller 5320 communicates over a power-auxiliary sensors-payload deck CAN bus 5328 to a power and auxiliary sensors signal processor 5915 (preferably a digital signal processor (DSP)) and a payload deck signal processor 5815 (preferably a digital signal processor (DSP)). The power and auxiliary sensors signal processor 5915 monitors any auxiliary sensors as well as the power source type, temperature, and available power level for each power source 90 connected to the signal processor 5915. The payload deck signal processor 5815 monitors the power source type, temperature, and available power level for each power source 90 connected to the payload deck 80. When multiple power sources 90 are installed on the robotic vehicle 10 (i.e. on the chassis 20 and/or the payload deck 80), the power management control logic 5410 detects via the auxiliary sensors signal processor 5915 and the payload deck signal processor 5815 the power source type, temperature, and available power level for each power source 90. The auxiliary sensors signal processor 5915 and the payload deck signal processor 5815 each control recharging of an associated power source 90 based on power source type, temperature, and available power level for each power source 90.

Figure 42:
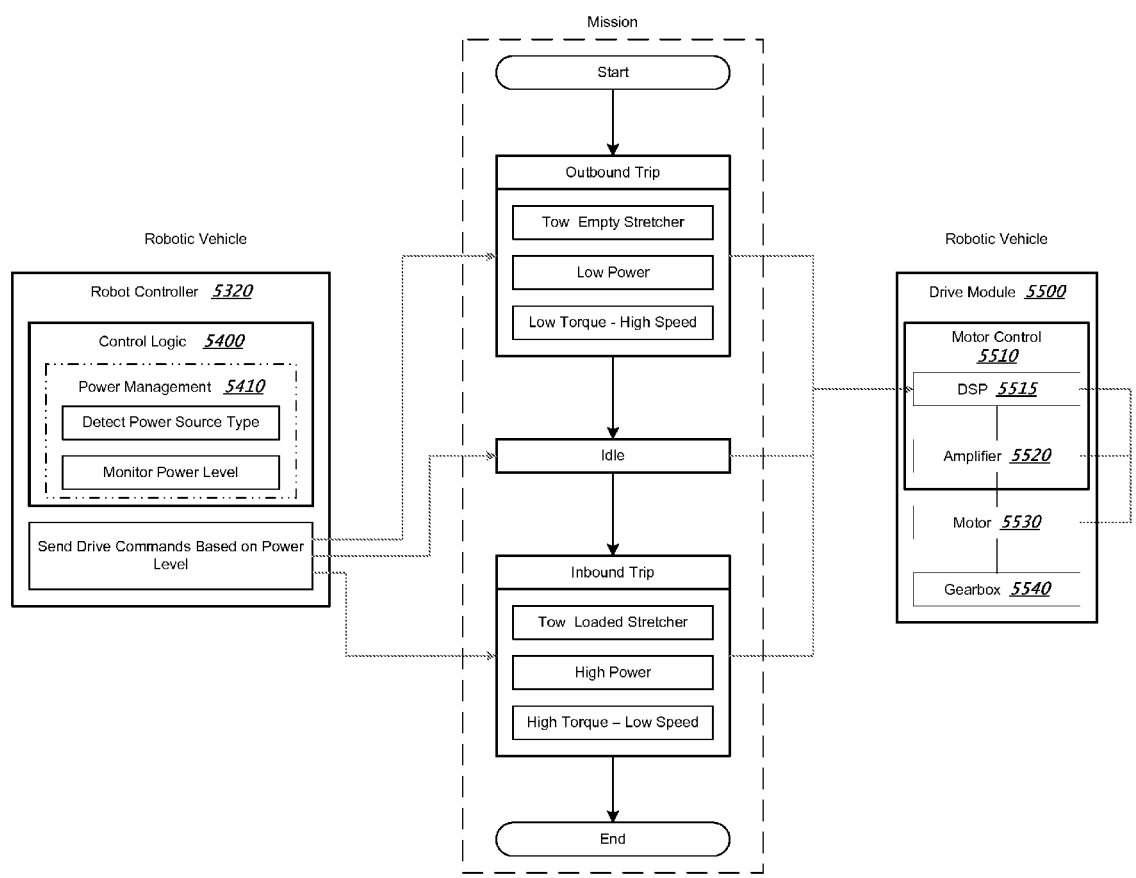
FIG. 42 is a schematic view of a robotic vehicle mission.

FIG. 42 provides a diagram of an example robotic vehicle mission. The robotic vehicle 10, starting from an idle state, must tow a stretcher out to a field location, wait while a casualty is loaded onto the stretcher, and then tow the stretcher and casualty back to either a second location or back to a stating location. For both the outbound and inbound trips, the robot controller 5320 sends drive commands to the drive modules 5500 based on an available power level, determined by the power management logic 410 in the control logic 5400 of the robot controller 5320. For the outbound trip, the robot controller 5320 sends a drive command for low-torque and high speed to quickly drive out with the empty stretcher. For the inbound trip, the robot controller 5320 sends a drive command for high-torque and low speed to slowly drive back with the load stretcher. The ability of the amplifier commutator 5520 to deliver a dynamic power range of both amplified and reduced power to the drive motor 5530 with a fixed gear ratio gear box 5540 allows the robotic vehicle 10 to drive quickly or slowly with low torque or high torque.

Other robotic vehicle details and features combinable with those described herein may be found in a U.S. Provisional filed Oct. 6, 2006, entitled "MANEUVERING ROBOTIC VEHICLES" and assigned Ser. No. 60/828,611, the entire contents of which are hereby incorporated by reference.

A number of implementations of the invention have been described. Nevertheless, it will be understood that various modifications may be made without departing from the spirit and scope of the invention. For example, flippers of varied length and payload decks with other means of functional payload attachment, such as snap-on, clamps, and magnets. Accordingly, other implementations are within the scope of the following claims.

What is claimed is:

1. A mobile robot comprising:
a chassis defining at least one chassis volume;
first and second sets of right and left driven flippers associated with the chassis, each flipper having a drive wheel and defining a flipper volume adjacent to the drive wheel, the first set of flippers disposed between the second set of flippers and the chassis;

motive power elements distributed among the chassis volume and the flipper volumes, the motive power elements comprising a battery assembly, a main drive motor assembly, and a load shifting motor assembly; and a load shifting assembly pivotally attached to the chassis and comprising a load tilting motor and a load shifting motor, the load shifting assembly defining a load shifting volume adjacent the load tilting motor, the motive power elements being distributed among the chassis volume, the load shifting volume, and the flipper volumes, wherein the main drive motor assembly comprises a main drive motor and a main drive motor amplifier, and the load shifting motor assembly comprises the load shifting motor and a load shifting motor amplifier.

2. The mobile robot of claim 1, wherein the first set of flippers are rigidly coupled to the chassis, and the second set of flippers are rotatable 360 degrees about a pivot axis near a forward end of the chassis, the first and second of flippers having a drive axis common with the pivot axis.

3. The mobile robot of claim 1, wherein each flipper comprises a driven track, each track trained about the corresponding drive wheel and defining the flipper volume within an envelope defined by the track.

4. The mobile robot of claim 1, wherein the main drive motor amplifier and the load shifting motor amplifier are disposed in at least one of the flipper volumes, the main drive motor and the load shifting motor are disposed in the chassis volume, and the battery assembly is disposed in the load shifting volume.

5. The mobile robot of claim 1, wherein the main drive motor amplifier is disposed in at least one of the flipper volumes, the main drive motor is disposed in the chassis volume, and the battery assembly and the load tilting motor are disposed in the load shifting volume so that the battery assembly tilts together with the load shifting assembly.

6. The mobile robot of claim 1, wherein the chassis extends into the flipper volumes defined by the first set of flippers, at least one of the flipper volumes defined by the first set of flippers housing the main drive motor amplifier, the chassis volume housing the main drive motor, and the load shifting volume housing the battery assembly and the load tilting motor assembly.

7. The mobile robot of claim 1, wherein the shifting motor amplifier is housed in at least one of the flipper volumes.

8. The mobile robot of claim 1, wherein the load shifting assembly comprises a linkage connecting a payload assembly to the chassis, the linkage having a first end rotatably connected to the chassis at a first pivot, and a second end rotatably connected to the payload assembly at a second pivot, both of the first and second pivots including independently controllable pivot drivers operable to rotatably position their corresponding pivots to control both fore-aft position and pitch orientation of the payload assembly with respect to the chassis.

9. The mobile robot of claim 8, wherein the independently controllable pivot drivers provide both fore-aft position and pitch orientation of the payload assembly with respect to the chassis to selectively displace a center of gravity of the payload assembly both forward and rearward of a center of gravity of the chassis.

10. The mobile robot of claim 8, wherein the first end of the linkage is rotatably connected near the front of the chassis, such that the payload assembly is displaceable to an aft-most position in which the payload assembly is located within a footprint of the chassis.

11. The mobile robot of claim 1, wherein a center of gravity of the robot remains within an envelope of rotation of the second set of flippers.

12. An obstacle climbing mobile robot comprising:
a chassis;
first and second sets of right and left driven flippers associated with the chassis, the first set of flippers disposed between the second set of flippers and the chassis, each flipper having a drive wheel and defining a first volume adjacent to the drive wheel;
a load shifting assembly associated with the chassis and including a tilt motor, the load shifting assembly defining a second volume adjacent the tilt motor, the chassis defining a third volume adjacent at least one of the drive wheels; and
motive power elements distributed among the first volumes, the second volume, and the third volume, the motive power elements comprising a battery assembly, a main drive motor assembly, and a load shifting motor assembly.

13. The obstacle climbing mobile robot of claim 12, wherein the main drive motor assembly comprises a main drive motor amplifier and a main drive motor, and the load shifting motor assembly comprises a load shifting motor amplifier and a load shifting motor.

14. The obstacle climbing mobile robot of claim 13, wherein at least one of the first volumes houses the main drive motor amplifier and the load shifting motor amplifier, the second volume houses the battery assembly, and the third volume houses the main drive motor and the load shifting motor.

15. The obstacle climbing mobile robot of claim 13, wherein at least one of the first volume houses the main drive motor amplifier, the second volume houses the battery assembly and the load tilting motor, so that the battery assembly tilts together with the load shifting assembly, and the third volume houses the main drive motor.

16. A mobile robot comprising:
a chassis defining at least one chassis volume;
first and second sets of right and left driven flippers associated with the chassis, each flipper having a drive wheel and defining a flipper volume adjacent to the drive wheel, the first set of flippers disposed between the second set of flippers and the chassis; and
motive power elements distributed among the chassis volume and the flipper volumes, the motive power elements comprising a battery assembly, a main drive motor assembly, and a load shifting motor assembly; and
a load shifting assembly pivotally attached to the chassis and comprising a load tilting motor and a load shifting motor, the load shifting assembly defining a load shifting volume adjacent the load tilting motor, the motive power elements being distributed among the chassis volume, the load shifting volume, and the flipper volumes,
wherein the load shifting assembly comprises a linkage connecting a payload assembly to the chassis, the linkage having a first end rotatably connected to the chassis at a first pivot, and a second end rotatably connected to the payload assembly at a second pivot, both of the first and second pivots including independently controllable pivot drivers operable to rotatably position their corresponding pivots to control both fore-aft position and pitch orientation of the payload assembly with respect to the chassis.

17. The mobile robot of claim 16, wherein the independently controllable pivot drivers provide both fore-aft position and pitch orientation of the payload assembly with respect to the chassis to selectively displace a center of gravity of the payload assembly both forward and rearward of a center of gravity of the chassis.

18. The mobile robot of claim 16, wherein the first end of the linkage is rotatably connected near the front of the chassis, such that the payload assembly is displaceable to an aft-most position in which the payload assembly is located within a footprint of the chassis.

* * * * *

UNITED STATES PATENT AND TRADEMARK OFFICE
CERTIFICATE OF CORRECTION

PATENT NO. : 7,784,570 B2  Page 1 of 1
APPLICATION NO. : 11/834658
DATED : August 31, 2010
INVENTOR(S) : Adam P. Couture et al.

It is certified that error appears in the above-identified patent and that said Letters Patent is hereby corrected as shown below:

On the Title Page, Item (60), Line 5-6, Related U.S. Application Data;
Delete "Oct. 10, 2006" and Insert --Oct. 6, 2006--

Column 1, Line 8;
Delete "Oct. 10, 2006" and Insert --Oct. 6, 2006--

Signed and Sealed this

Sixteenth Day of November, 2010

David J. Kappos
*Director of the United States Patent and Trademark Office*